United States Patent
Zhang et al.

(10) Patent No.: US 12,432,743 B2
(45) Date of Patent: Sep. 30, 2025

(54) TECHNIQUES FOR SLOT FORMAT CONFIGURATION PER RESOURCE BLOCK SET FOR SUBBAND FULL-DUPLEX OPERATION

(71) Applicant: QUALCOMM Incorporated, San Diego, CA (US)

(72) Inventors: Qian Zhang, Basking Ridge, NJ (US); Navid Abedini, Basking Ridge, NJ (US); Yan Zhou, San Diego, CA (US); Muhammad Sayed Khairy Abdelghaffar, San Jose, CA (US); Peter Gaal, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 569 days.

(21) Appl. No.: 17/886,340

(22) Filed: Aug. 11, 2022

(65) Prior Publication Data
US 2024/0057098 A1    Feb. 15, 2024

(51) Int. Cl.
*H04W 4/00* (2018.01)
*H04W 72/1273* (2023.01)
(Continued)

(52) U.S. Cl.
CPC ....... *H04W 72/23* (2023.01); *H04W 72/1273* (2013.01); *H04W 72/53* (2023.01); *H04L 5/003* (2013.01)

(58) Field of Classification Search
None
See application file for complete search history.

(56) References Cited

U.S. PATENT DOCUMENTS 11,219,008 B2 * 1/2022 Oh ................. H04L 1/1819
12,225,560 B2 * 2/2025 Noh ................ H04W 72/044
(Continued)

FOREIGN PATENT DOCUMENTS

WO  WO-2021210888 A1  10/2021

OTHER PUBLICATIONS

International Search Report and Written Opinion—PCT/US2023/070757—ISA/EPO—Nov. 24, 2023.

*Primary Examiner* — Bob A Phunkulh
(74) *Attorney, Agent, or Firm* — Holland & Hart LLP

(57) ABSTRACT

Methods, systems, and devices for wireless communications are described. In some aspects, a user equipment (UE) and a network entity may support one or more signaling-based mechanisms according to which the network entity may inform the UE of which time and frequency resources may be used for full-duplex communication. The network entity transmit a first message to configure multiple resource block (RB) sets for the UE, where each RB set is associated with unique identifying information. To inform the UE of which time and frequency resources may be used for full-duplex communication, the network entity may transmit a second message that indicates one or more slot formats on a per RB set basis. As such, the network entity may schedule the UE for full-duplex communication in accordance with indicating that overlapping symbols of a first RB set and a second RB set are allocated for uplink and downlink, respectively.

30 Claims, 18 Drawing Sheets

(51) Int. Cl.
*H04W 72/23* (2023.01)
*H04W 72/53* (2023.01)
*H04L 5/00* (2006.01)

(56) References Cited

U.S. PATENT DOCUMENTS

| | | | |
|---|---|---|---|
| 2022/0210678 A1* | 6/2022 | Kim | H04L 5/0057 |
| 2022/0385417 A1* | 12/2022 | Lin | H04L 5/0094 |
| 2023/0008100 A1* | 1/2023 | Yoshimura | H04W 72/0453 |
| 2023/0024992 A1 | 1/2023 | Kim et al. | |
| 2023/0136550 A1* | 5/2023 | Lei | H04L 5/0044 |
| | | | 370/329 |
| 2023/0224924 A1* | 7/2023 | Schober | H04W 72/23 |
| | | | 370/329 |
| 2023/0328704 A1* | 10/2023 | Oh | H04W 72/232 |
| | | | 370/329 |

* cited by examiner

TECHNIQUES FOR SLOT FORMAT CONFIGURATION PER RESOURCE BLOCK SET FOR SUBBAND FULL-DUPLEX OPERATION

FIELD OF TECHNOLOGY

The following relates to wireless communications, including techniques for slot format configuration per resource block (RB) set for subband full-duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for slot format configuration per resource block (RB) set for subband full-duplex operation. For example, the described techniques provide for indications of which time domain resources (e.g., which symbols or slots) are allocated for downlink communication, uplink communication, and flexible communication (e.g., either downlink or uplink communication) on a per RB set basis to support full-duplex operation at one or both of a network entity or a user equipment (UE). In some aspects, a network entity may indicate such per RB set slot format configurations via a message that links slot formats to respective RB sets via indexes corresponding to the respective RB sets, where each RB set is associated with a unique index.

A method for wireless communication at a UE is described. The method may include obtaining a first message that indicates a set of multiple RB sets and that indicates a set of multiple indexes corresponding to the set of multiple RB sets, obtaining a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set, and communicating using the at least one RB set in accordance with the at least one slot format.

An apparatus for wireless communication at a UE is described. The apparatus may include a processor, memory coupled with the processor, and instructions stored in the memory. The instructions may be executable by the processor to cause the apparatus to obtain a first message that indicates a set of multiple RB sets and that indicates a set of multiple indexes corresponding to the set of multiple RB sets, obtain a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set, and communicate using the at least one RB set in accordance with the at least one slot format.

Another apparatus for wireless communication at a UE is described. The apparatus may include means for obtaining a first message that indicates a set of multiple RB sets and that indicates a set of multiple indexes corresponding to the set of multiple RB sets, means for obtaining a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set, and means for communicating using the at least one RB set in accordance with the at least one slot format.

A non-transitory computer-readable medium storing code for wireless communication at a UE is described. The code may include instructions executable by a processor to obtain a first message that indicates a set of multiple RB sets and that indicates a set of multiple indexes corresponding to the set of multiple RB sets, obtain a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set, and communicate using the at least one RB set in accordance with the at least one slot format.

In some examples of the method, apparatuses, and non-transitory computer-readable medium described herein, the at least one slot format includes a set of multiple slot formats, the at least one RB set includes the set of multiple RB sets, each slot format from the set of multiple slot formats may be associated with a respective RB set from the set of multiple RB sets, and the set of multiple slot formats includes a first slot format for a first RB set and a second slot format for a second RB set, the first RB set and the second RB set being from the set of multiple RB sets.

In some examples of the method, apparatuses, and non-transitory computer-readable medium described herein, the second message indicates a first sequence of communication directions for time domain resources associated with the first slot format and a second sequence of communication directions for time domain resources associated with the second slot format, the first sequence of communication directions may be different from the second sequence of communication directions, and the UE communicates in accordance with a full-duplex communication mode based on the first sequence of communication directions and the second sequence of communication directions.

In some examples of the method, apparatuses, and non-transitory computer-readable medium described herein, the first message or the second message, or both, further indicate a resource allocation for a guard band between the first RB set and the second RB set and the first message and the second message may be a same message or may be different messages.

In some examples of the method, apparatuses, and non-transitory computer-readable medium described herein, the set of multiple slot formats includes a third slot format for a third RB set from the set of multiple RB sets, the third slot format indicates that a portion of the third RB set may be unavailable for communications when the first slot format and the second slot format indicate full-duplex operation, and the third RB set may be the guard band.

In some examples of the method, apparatuses, and non-transitory computer-readable medium described herein, the third RB set may be located between the first RB set and the second RB set.

Some examples of the method, apparatuses, and non-transitory computer-readable medium described herein may further include operations, features, means, or instructions for obtaining an indication of a set of multiple RBs between the first RB set and the second RB set, where the set of multiple RBs may be unavailable for communications when the first slot format and the second slot format indicate full-duplex operation, and where the set of multiple RBs may be the guard band.

Some examples of the method, apparatuses, and non-transitory computer-readable medium described herein may further include operations, features, means, or instructions for adding a set of multiple RBs between the first RB set and the second RB set, where the set of multiple RBs may be unavailable for communications when the first slot format and the second slot format indicate full-duplex operation, and where the set of multiple RBs may be the guard band.

Some examples of the method, apparatuses, and non-transitory computer-readable medium described herein may further include operations, features, means, or instructions for reserving, based on a defined rule, a set of multiple RBs from the second RB set when the first slot format and the second slot format indicate full-duplex operation, where the set of multiple RBs interfaces with the first RB set, and where the set of multiple RBs may be the guard band.

In some examples of the method, apparatuses, and non-transitory computer-readable medium described herein, each slot format from the at least one slot format may be associated with a respective RB set from the at least one RB set and one or more RB sets not in the at least one RB set may be equivalent to one or more guard bands for the at least one RB set.

Some examples of the method, apparatuses, and non-transitory computer-readable medium described herein may further include operations, features, means, or instructions for obtaining a third message that indicates a baseline slot format for a bandwidth that includes the set of multiple RB sets, where the set of multiple RB sets, including the at least one RB set indicated by the second message, may be associated with the baseline slot format, updating the at least one RB set from the baseline slot format to the at least one slot format indicated for the at least one RB set by the second message, the update being responsive to obtaining the second message, and communicating, in accordance with the baseline slot format, via a portion of the bandwidth that excludes the at least one RB set.

In some examples of the method, apparatuses, and non-transitory computer-readable medium described herein, the slot format indicated for the RB set by the second message may be to overwrite the baseline slot format for the bandwidth in accordance with a defined rule.

Some examples of the method, apparatuses, and non-transitory computer-readable medium described herein may further include operations, features, means, or instructions for obtaining a fourth message that indicates whether the at least one slot format indicated for the at least one RB set by the second message may be to overwrite the baseline slot format for the bandwidth, where the update from the baseline slot format to the at least one slot format indicated for the at least one RB set by the second message may be in accordance with the fourth message indicating that the at least one slot format indicated for the at least one RB set by the second message may be to overwrite the baseline slot format for the bandwidth.

In some examples of the method, apparatuses, and non-transitory computer-readable medium described herein, the first message indicates, for each respective RB set from the set of multiple RB sets, a respective indication of a respective quantity of RBs in the respective RB set and the RB set includes a first quantity of RBs in accordance with a first indication for the RB set and a second RB set includes a second quantity of RBs in accordance with a second indication for the second RB set.

In some examples of the method, apparatuses, and non-transitory computer-readable medium described herein, each index from the set of multiple indexes indicates a frequency domain location of a corresponding RB set from the set of multiple RB sets and each index includes a starting RB index or an ending RB index.

In some examples of the method, apparatuses, and non-transitory computer-readable medium described herein, the communication may be in accordance with a full-duplex communication operation and the full-duplex communications operation may be associated with the at least one slot format and one or more slot formats indicated for other RB sets of the set of multiple RB sets.

In some examples of the method, apparatuses, and non-transitory computer-readable medium described herein, each RB set from the set of multiple RB sets may be associated with a downlink subband or an uplink subband and the full-duplex communication operation includes subband full-duplex operation at the UE.

A method for wireless communication at a wireless node is described. The method may include receiving a first message that indicates a set of multiple RB sets and that indicates a set of multiple indexes corresponding to the set of multiple RB sets, receiving a second message that includes at least one index corresponding to at least one RB set from the set of multiple RB sets and that indicates at least one slot format for the at least one RB set, where a respective slot format of the at least one slot format corresponds to a respective RB set of the at least one RB sett, and communicating using the at least one RB set in accordance with the at least one slot format.

An apparatus for wireless communication at a wireless node is described. The apparatus may include a processor, memory coupled with the processor, and instructions stored in the memory. The instructions may be executable by the processor to cause the apparatus to receive a first message that indicates a set of multiple RB sets and that indicates a set of multiple indexes corresponding to the set of multiple RB sets, receive a second message that includes at least one index corresponding to at least one RB set from the set of multiple RB sets and that indicates at least one slot format for the at least one RB set, where a respective slot format of the at least one slot format corresponds to a respective RB set of the at least one RB sett, and communicate using the at least one RB set in accordance with the at least one slot format.

Another apparatus for wireless communication at a wireless node is described. The apparatus may include means for receiving a first message that indicates a set of multiple RB sets and that indicates a set of multiple indexes corresponding to the set of multiple RB sets, means for receiving a second message that includes at least one index corresponding to at least one RB set from the set of multiple RB sets and that indicates at least one slot format for the at least one RB set, where a respective slot format of the at least one slot format corresponds to a respective RB set of the at least one RB sett, and means for communicating using the at least one RB set in accordance with the at least one slot format.

A non-transitory computer-readable medium storing code for wireless communication at a wireless node is described. The code may include instructions executable by a processor to receive a first message that indicates a set of multiple RB sets and that indicates a set of multiple indexes corresponding to the set of multiple RB sets, receive a second message that includes at least one index corresponding to at least one RB set from the set of multiple RB sets and that indicates at least one slot format for the at least one RB set, where a respective slot format of the at least one slot format corresponds to a respective RB set of the at least one RB sett, and communicate using the at least one RB set in accordance with the at least one slot format.

In some examples of the method, apparatuses, and non-transitory computer-readable medium described herein, receiving the first message and the second message may include operations, features, means, or instructions for receiving the first message and the second message from a centralized unit (CU) via an F1 interface, where the first message and the second message indicate a subband configuration per cell to the wireless node, and where the wireless node may be a distributed unit (DU).

In some examples of the method, apparatuses, and non-transitory computer-readable medium described herein, receiving the first message and the second message may include operations, features, means, or instructions for receiving the first message and the second message from a network entity via radio resource control (RRC) signaling as a semi-static indication of a subband configuration, and where the wireless node may be a UE.

In some examples of the method, apparatuses, and non-transitory computer-readable medium described herein, receiving the first message and the second message may include operations, features, means, or instructions for receiving the first message and the second message from a network entity via one or more medium access control (MAC) control elements (MAC-CEs) or downlink control information (DCI) as a dynamic indication of a subband configuration, and where the wireless node may be a UE.

In some examples of the method, apparatuses, and non-transitory computer-readable medium described herein, receiving the first message and the second message may include operations, features, means, or instructions for receiving the first message and the second message from a network entity via one or more system information blocks (SIBs) as a broadcast of a subband configuration, and where the wireless node may be a UE.

A method for wireless communication at a network entity is described. The method may include outputting a first message that indicates a set of multiple RB sets and that indicates a set of multiple indexes corresponding to the set of multiple RB sets, outputting a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set, and communicating using the at least one RB set in accordance with the at least one slot format.

An apparatus for wireless communication at a network entity is described. The apparatus may include a processor, memory coupled with the processor, and instructions stored in the memory. The instructions may be executable by the processor to cause the apparatus to output a first message that indicates a set of multiple RB sets and that indicates a set of multiple indexes corresponding to the set of multiple RB sets, output a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set, and communicate using the at least one RB set in accordance with the at least one slot format.

Another apparatus for wireless communication at a network entity is described. The apparatus may include means for outputting a first message that indicates a set of multiple RB sets and that indicates a set of multiple indexes corresponding to the set of multiple RB sets, means for outputting a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set, and means for communicating using the at least one RB set in accordance with the at least one slot format.

A non-transitory computer-readable medium storing code for wireless communication at a network entity is described. The code may include instructions executable by a processor to output a first message that indicates a set of multiple RB sets and that indicates a set of multiple indexes corresponding to the set of multiple RB sets, output a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set, and communicate using the at least one RB set in accordance with the at least one slot format.

In some examples of the method, apparatuses, and non-transitory computer-readable medium described herein, the at least one slot format includes a set of multiple slot formats, the at least one RB set includes the set of multiple RB sets, each slot format from the set of multiple slot formats may be associated with a respective RB set from the set of multiple RB sets, and the set of multiple slot formats includes a first slot format for a first RB set and a second slot format for a second RB set, the first RB set and the second RB set being from the set of multiple RB sets.

In some examples of the method, apparatuses, and non-transitory computer-readable medium described herein, the second message indicates a first sequence of communication directions for time domain resources associated with the first slot format and a second sequence of communication directions for time domain resources associated with the second slot format, the first sequence of communication directions may be different from the second sequence of communication directions, and the network entity communicates in accordance with a full-duplex communication mode based on the first sequence of communication directions and the second sequence of communication directions.

In some examples of the method, apparatuses, and non-transitory computer-readable medium described herein, the first message or the second message, or both, further indicate a resource allocation for a guard band between the first RB set and the second RB set and the first message and the second message may be a same message or may be different messages.

In some examples of the method, apparatuses, and non-transitory computer-readable medium described herein, the set of multiple slot formats includes a third slot format for a third RB set from the set of multiple RB sets, the third slot format indicates that a portion of the third RB set may be unavailable for communications when the first slot format and the second slot format indicate full-duplex operation, and the third RB set may be the guard band.

In some examples of the method, apparatuses, and non-transitory computer-readable medium described herein, the third RB set may be located between the first RB set and the second RB set.

Some examples of the method, apparatuses, and non-transitory computer-readable medium described herein may further include operations, features, means, or instructions for outputting an indication of a set of multiple RBs between the first RB set and the second RB set, where the set of multiple RBs may be unavailable for communications when the first slot format and the second slot format indicate full-duplex operation, and where the set of multiple RBs may be the guard band.

Some examples of the method, apparatuses, and non-transitory computer-readable medium described herein may further include operations, features, means, or instructions for adding a set of multiple RBs between the first RB set and the second RB set, where the set of multiple RBs may be unavailable for communications when the first slot format and the second slot format indicate full-duplex operation, and where the set of multiple RBs may be the guard band.

Some examples of the method, apparatuses, and non-transitory computer-readable medium described herein may further include operations, features, means, or instructions for reserving, based on a defined rule, a set of multiple RBs from the second RB set when the first slot format and the second slot format indicate full-duplex operation, where the set of multiple RBs interfaces with the first RB set, and where the set of multiple RBs may be the guard band.

In some examples of the method, apparatuses, and non-transitory computer-readable medium described herein, each slot format from the at least one slot format may be associated with a respective RB set from the at least one RB set and one or more RB sets not in the at least one RB set may be equivalent to one or more guard bands for the at least one RB set.

Some examples of the method, apparatuses, and non-transitory computer-readable medium described herein may further include operations, features, means, or instructions for outputting a third message that indicates a baseline slot format for a bandwidth that includes the set of multiple RB sets, where the set of multiple RB sets, including the at least one RB set indicated by the second message, may be associated with the baseline slot format, updating the at least one RB set from the baseline slot format to the at least one slot format indicated for the at least one RB set by the second message, the update being responsive to obtaining the second message, and communicating, in accordance with the baseline slot format, via a portion of the bandwidth that excludes the at least one RB set.

In some examples of the method, apparatuses, and non-transitory computer-readable medium described herein, the slot format indicated for the RB set by the second message may be to overwrite the baseline slot format for the bandwidth in accordance with a defined rule.

Some examples of the method, apparatuses, and non-transitory computer-readable medium described herein may further include operations, features, means, or instructions for outputting a fourth message that indicates whether the at least one slot format indicated for the at least one RB set by the second message may be to overwrite the baseline slot format for the bandwidth, where the update from the baseline slot format to the at least one slot format indicated for the at least one RB set by the second message may be in accordance with the fourth message indicating that the at least one slot format indicated for the at least one RB set by the second message may be to overwrite the baseline slot format for the bandwidth.

In some examples of the method, apparatuses, and non-transitory computer-readable medium described herein, the first message indicates, for each respective RB set from the set of multiple RB sets, a respective indication of a respective quantity of RBs in the respective RB set and the RB set includes a first quantity of RBs in accordance with a first indication for the RB set and a second RB set includes a second quantity of RBs in accordance with a second indication for the second RB set.

In some examples of the method, apparatuses, and non-transitory computer-readable medium described herein, each index from the set of multiple indexes indicates a frequency domain location of a corresponding RB set from the set of multiple RB sets and each index includes a starting RB index or an ending RB index.

In some examples of the method, apparatuses, and non-transitory computer-readable medium described herein, the communication may be in accordance with a full-duplex communication operation and the full-duplex communications operation may be associated with the at least one slot format and one or more slot formats indicated for other RB sets of the set of multiple RB sets.

In some examples of the method, apparatuses, and non-transitory computer-readable medium described herein, each RB set from the set of multiple RB sets may be associated with a downlink subband or an uplink subband and the full-duplex communication mode includes subband full-duplex operation at the network entity.

DETAILED DESCRIPTION

Figure 1:
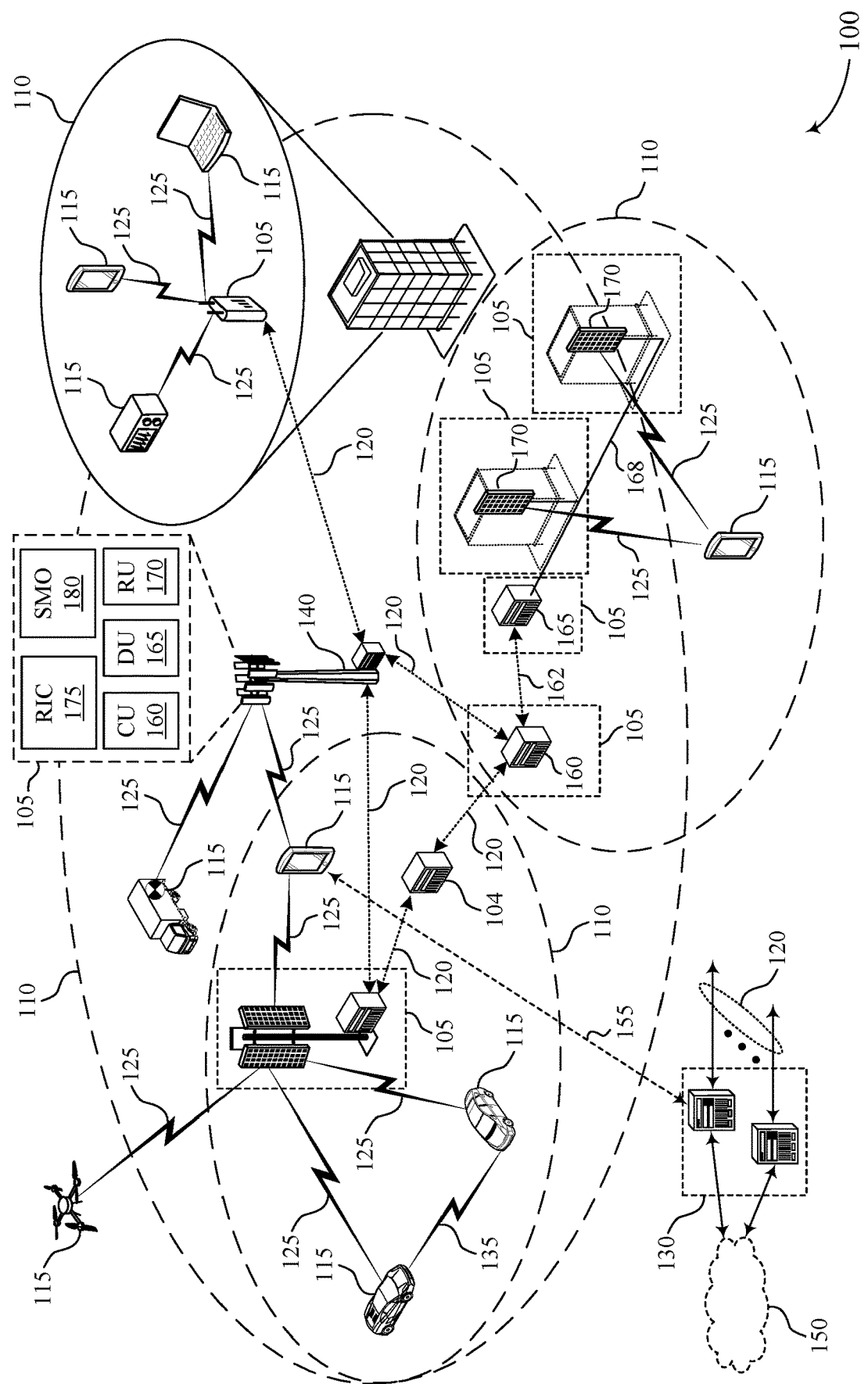
FIG. 1 shows an example wireless communications system that supports techniques for slot format configuration per resource block (RB) set for subband full-duplex operation in accordance with one or more aspects of the present disclosure.

In some wireless communications systems, a wireless device may communicate with one or more other wireless devices in accordance with a half-duplex mode (according to which the wireless device may transmit or receive at non-overlapping times) or a full-duplex mode (according to which the wireless device may transmit and receive simultaneously). Full-duplex communication may provide greater system capacity, higher data rates, and lower latency, but some systems may lack efficient mechanisms according to which wireless devices may coordinate on which time and frequency resources are available for full-duplex communication. For example, some systems may lack an efficient signaling mechanism according to which a network entity may inform a user equipment (UE) of which time and frequency resources may be used for full-duplex communication. Further, such systems may also lack an efficient mechanism according to which the network entity and the UE may obtain a mutual understanding of which time and frequency resources are to be used as a guard band when one or both of the network entity and the UE are communicating in accordance with a full-duplex communications mode.

In some implementations, a UE and a network entity may support one or more signaling-based mechanisms according to which the network entity may inform the UE of which time and frequency resources may be used for full-duplex communication. Further, the UE and the network entity may support one or more configuration- or signaling-based mechanisms according to which the UE and the network entity may obtain, identify, or otherwise determine a same understanding relating to which time and frequency resources may be used as a guard band when full-duplex communication is scheduled. To inform the UE of which time and frequency resources may be used for full-duplex communication, the network entity may configure multiple resource block (RB) sets for the UE, each RB set associated with unique identifying information (e.g., one or more RB indexes or a bandwidth indication, or a combination thereof), and may indicate a slot format for one or more of the multiple RB sets. To obtain, identify, or otherwise determine a same understanding relating to which time and frequency resources may be used as a guard band, the UE and the network entity may signal how many RBs are to be left unused between simultaneous uplink and downlink communication or may select RBs (or an RB set) to be left unused between simultaneous uplink and downlink communication in accordance with a defined rule (e.g., a dynamically defined or predefined rule).

Particular implementations of the subject matter described in this disclosure can be implemented to realize one or more of the following potential advantages. For example, as a result of implementing the described mechanisms according to which a UE and a network entity may signal which resources may be used for full-duplex communications and according to which the UE and the network entity may obtain a same understanding relating to which resources may be used as a guard band, the UE and the network entity may achieve the advantages associated with full-duplex communication (e.g., greater system capacity, higher data rates, and lower latency) while maintaining efficient and non-ambiguous control signaling. As such, the UE and the network entity may more easily convey which resources may be used for full-duplex communication, which may result in fewer communication errors and less complex scheduling commands. Accordingly, the UE and the network entity may further support greater spectral efficiency, among other benefits.

Further, the described techniques may facilitate greater adoption of full-duplex operation, which may provide other benefits to adopting systems. For example, full-duplex operation may support longer uplink duty cycles, which may lead to latency reduction and greater uplink coverage. For example, in accordance with full-duplex operation, the UE may receive a downlink signal in "uplink only" slots, which may enable or otherwise facilitate latency savings. Further, full-duplex operation may increase system capacity, resource utilization, and spectrum efficiency and enable flexible and dynamic uplink or downlink resource adaptation according to uplink or downlink traffic in a robust (such as reliable) manner. For example, full-duplex operations may offer solutions to some dynamic time division duplexing (TDD) challenges.

Aspects of the disclosure are initially described in the context of wireless communications systems. Aspects of the disclosure are additionally illustrated by and described with reference to multiplexing modes, a signaling diagram, guard band configurations, and a process flow. Aspects of the disclosure are further illustrated by and described with reference to apparatus diagrams, system diagrams, and flowcharts that relate to techniques for slot format configuration per resource block set for subband full-duplex operation.

FIG. 1 shows an example of a wireless communications system 100 that supports techniques for slot format configuration per RB set for subband full-duplex operation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for slot format configuration per resource block set for subband full-duplex operation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a subband, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Various devices within the wireless communications system 100 may support one or more levels of duplex operation, which may depend on or be associated with a deployment scenario, a duplex mode (such as TDD only, FDD only, or both TDD and FDD), or an interference management procedure. In some aspects, a wireless device (such as a UE 115, a network entity 105, or an IAB node 104) within the wireless communications system 100 may support half-duplex or full-duplex operation. For example, a network entity 105 may support various types of MIMO communication, including downlink multi-user MIMO (MU-MIMO) according to which the network entity 105 may transmit downlink signaling to two different UEs 115 simultaneously, uplink MU-MIMO according to which the network entity may receive uplink signaling from two different UEs 115 simultaneously, or downlink and uplink MU-MIMO (which may be referred to herein as full-duplex operation) according to which the network entity 105 may transmit downlink signaling to a first UE 115 while simultaneously receiving uplink signaling from a second UE 115. A network entity 105 may further support enhanced MIMO (eMIMO) or further enhanced MIMO (FeMIMO), which may be associated with an FeMIMO beam management session. In accordance with full-duplex operation, a wireless device may be capable of transmitting and receiving simultaneously. In other words, the wireless device may support simultaneous uplink and downlink transmissions (such as an uplink transmission and a downlink transmission that at least partially overlap in time).

Full-duplex operation may include subband full-duplex (SBFD) according to which simultaneous transmission or reception of downlink or uplink signaling may be on a per subband basis or in-band full-duplex (IBFD). In accordance with SBFD, a component carrier bandwidth may be separated, in the frequency domain, to a set of one or more downlink portions and a set of one or more uplink portions for a given time duration (such as for a given slot). For example, within a slot, downlink communication may occur via a first set of one or more frequency bands and uplink communication may occur via a second set of one or more frequency bands. Further, full-duplex operation may include simultaneous transmission and reception on a same symbol, TTI, or slot.

In accordance with half-duplex operation, a wireless device may transmit or receive, but may not transmit and receive simultaneously. A wireless device may support full-duplex operation across various RF bands. For example, a wireless device may support simultaneous uplink and downlink transmissions within a frequency range 1 (FR1) band, within an FR2 band, or across FR1 and FR2 bands. In scenarios in which a wireless device supports simultaneous uplink and downlink transmissions within an FR2 band, the wireless device may further support associated aspects of procedures to enable or facilitate suitable FR2 communication.

Full-duplex capability may be present at either or both of a network entity 105 or a UE 115. In scenarios in which a UE 115 is capable of full-duplex operation, the UE 115 may use a first antenna panel, module, or set of elements for uplink transmission (such as transmitting to a network entity 105) and may use a second antenna panel, module, or set of elements for downlink reception (such as receiving from a network entity 105). In scenarios in which a network entity 105 is capable of full-duplex operation, the network entity 105 may use a first antenna panel, module, or set of elements for uplink reception (such as receiving from a UE 115) and may use a second antenna panel, module, or set of elements for downlink transmission (such as transmitting to a UE 115). In some aspects, a full-duplex capability may be conditional on one or more transmission parameters. For example, a full-duplex capability may be conditional on a beam separation (such as a separation between a first directional beam used for uplink and a second directional beam used for downlink), which may relate or contribute to self-interference between downlink and uplink signaling and clutter (such as clutter echoes, which may refer to interference-causing scattered signals). As such, a wireless device may use full-duplex operation if a first directional beam used for uplink transmission or reception is sufficiently separated from a second directional beam used for downlink transmission or reception in a spatial domain. In some aspects, an amount of self-interference may be associated with or correlate to a distance d between a transmit antenna panel and a receive antenna panel.

In some implementations, a UE 115 and a network entity 105 may support one or more signaling-based mechanisms according to which the network entity 105 may inform the UE 115 of which time and frequency resources may be used for full-duplex communication. Further, the UE 115 and the network entity 105 may support one or more configuration- or signaling-based mechanisms according to which the UE 115 and the network entity 105 may obtain, identify, or otherwise determine a same understanding relating to which time and frequency resources may be used as a guard band when full-duplex communication is scheduled. To inform the UE 115 of which time and frequency resources may be used for full-duplex communication, the network entity 105 may configure multiple RB sets for the UE 115, each RB set associated with unique identifying information (e.g., one or more RB indexes or a bandwidth indication, or a combination thereof), and may indicate a slot format for one or more of the multiple RB sets. To obtain, identify, or otherwise determine a same understanding relating to which time and frequency resources may be used as a guard band, the UE 115 and the network entity 105 may signal how many RBs are to be left unused between simultaneous uplink and downlink communication or may select RBs (or an RB set) to be left unused between simultaneous uplink and downlink communication in accordance with a defined rule (e.g., a dynamically defined or predefined rule).

Figure 2:
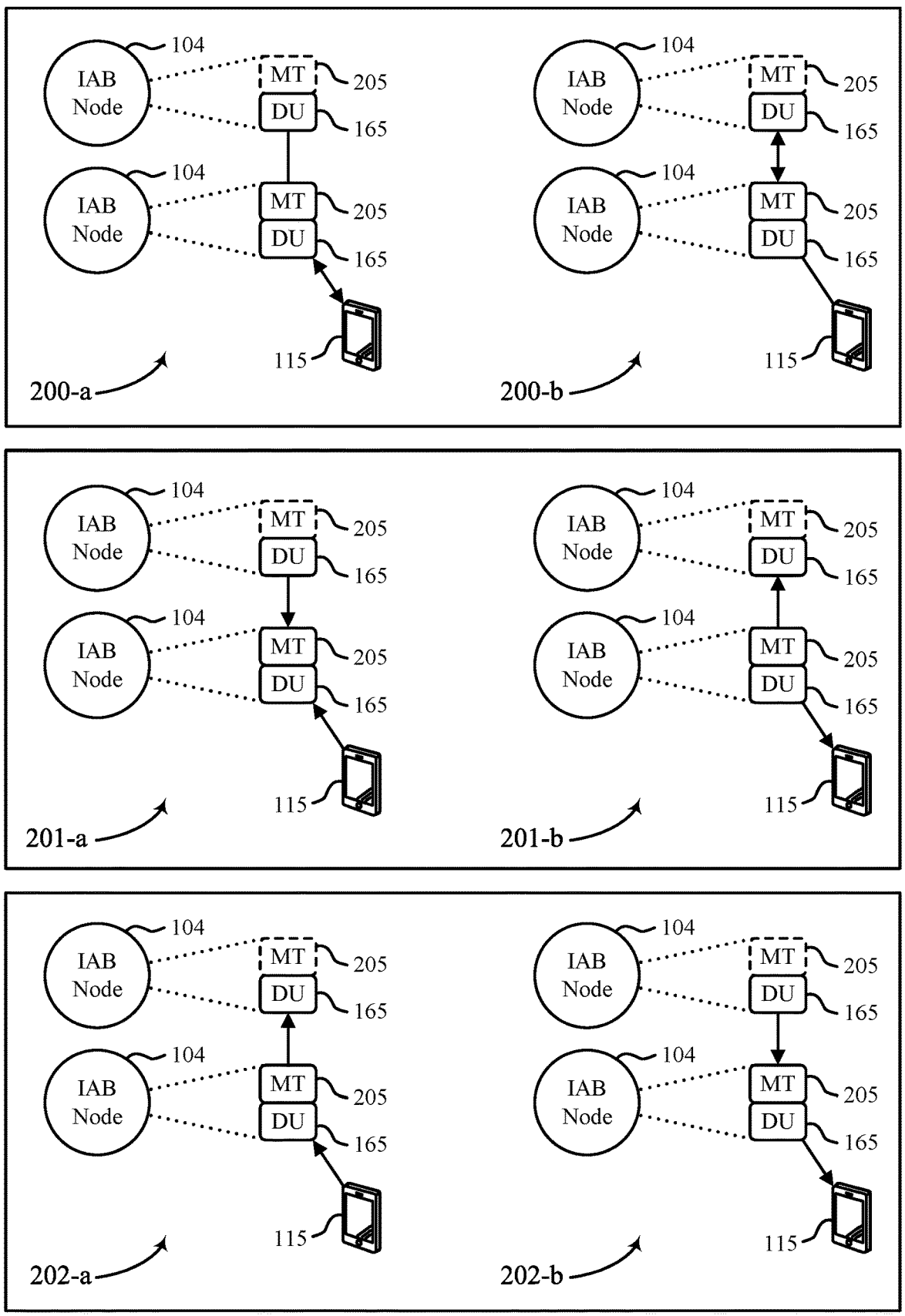
FIG. 2 shows example multiplexing modes that support techniques for slot format configuration per RB set for subband full-duplex operation in accordance with one or more aspects of the present disclosure.

FIG. 2 shows example multiplexing modes 200, 201, and 202 that support techniques for slot format configuration per RB set for subband full-duplex operation in accordance with one or more aspects of the present disclosure. The multiplexing modes 200, 201, and 202 may be implemented to realize or facilitate aspects of the wireless communications system 100. For example, the multiplexing modes 200, 201, and 202 illustrate communication between IAB nodes 104, MT devices 205, DUs 165, and UEs 115, which may be examples of corresponding devices as illustrated by and described with reference to FIG. 1. In some implementations, the multiplexing modes 200, 201, and 202 may support one or more signaling-based mechanisms according to which a first device (such as an IAB node 205 or another network entity 105) may inform a UE 115 of which time and frequency resources may be used for full-duplex communication.

In some systems, a network entity 105 or one or more TRPs, or any combination thereof, may communicate with (e.g., transmit to, receive from, output for transmission to, obtain from, or any combination thereof) a UE 115 in accordance with a "baseline" non-full-duplex operation. In such systems, flexible TDD may be disabled at both the network entity 105 and the UE 115. Alternatively, a network entity 105 or one or more TRPs, or any combination thereof, may communicate with (e.g., transmit to, receive from, output for transmission to, obtain from, or any combination thereof) a UE 115 in accordance with any one or more of various types of full-duplex. Such types of full-duplex may involve full-duplex operation at the UE 115 or at the network entity 105 (optionally via one or more TRPs), or at both.

In a first example type of full-duplex, a UE 115 may communicate with a first TRP (such as a TRP 1) via downlink (such that the TRP 1 transmits signaling to the UE 115) and the UE 115 may communicate with a second TRP (such as a TRP 2) via uplink (such that the UE 115 transmits signaling to the TRP 2). In such a first example type of full-duplex (which may be associated with an mTRP deployment), flexible TDD may be disabled at a network entity 105 and flexible TDD may be enabled at the UE 115. In a second example type of full-duplex, a network entity 105 may communicate with a first UE 115 via downlink and may communicate with a second UE 115 via uplink. In such a second example type of full-duplex (which may be associated with an IAB deployment), flexible TDD may be enabled at the network entity 105 and flexible TDD may be disabled at the first and second UEs 115. In a third example type of full-duplex, a network entity 105 may communicate with a UE 115 via both downlink and uplink. In such a third example type of full-duplex, flexible TDD may be enabled at both the network entity 105 and the UE 115.

Further, one or more network entities 105 or one or more TRPs, or any combination thereof, may communicate with (e.g., transmit to, receive from, output for transmission to, obtain from, or any combination thereof) one or more UEs 115 in accordance with one or more of various deployment scenarios that leverage a type of full-duplex. In a first deployment scenario, a full-duplex network entity 105 (e.g., a base station 140 as illustrated by and described with reference to FIG. 1) may communicate with multiple half-duplex UEs 115. For example, a first network entity 105 may transmit downlink signaling to a first UE 115 and may simultaneously receive uplink signaling from a second UE 115. A second network entity 105 may transmit downlink signaling to a third UE 115 and may simultaneously receive uplink signaling from a fourth UE 115. In such deployment scenarios, cross-link interference (CLI) may occur between the various communicating devices (where uplink signaling may interference with downlink signaling) and each of the two full-duplex network entities 105 may experience some amount of self-interference.

In a second deployment scenario, a full-duplex network entity 105 may communicate with a full-duplex UE 115 (such as a full-duplex customer premises equipment (CPE)). For example, the full-duplex network entity 105 may transmit downlink signaling to the full-duplex UE 115 and simultaneously receive uplink signaling from the full-duplex UE 115. In some aspects, the full-duplex network entity 105 also may transmit downlink signaling to another UE 115 (such as a half-duplex UE 115) and, in such aspects, CLI may occur between the two UEs 115. Further, the full-duplex network entity 105 may experience CLI from another network entity 105 and both of the full-duplex network entity 105 and the full-duplex UE 115 may experience self-interference.

In a third deployment scenario, a half-duplex network entity 105 or TRP (such as in an mTRP deployment) may communicate with a full-duplex UE 115 (such as a full-duplex CPE). For example, a first network entity 105 or TRP may transmit downlink signaling to the full-duplex UE 115 and the full-duplex UE 115 may simultaneously transmit uplink signaling to a second network entity 105 or TRP. In some aspects, the first network entity 105 or TRP also may transmit downlink signaling to another UE 115 (such as a half-duplex UE 115) and, in such aspects, CLI may occur between the two UEs 115. Further, the two network entities 105 or TRPs may experience CLI and the full-duplex UE 115 may experience self-interference.

In a fourth deployment scenario, a full-duplex IAB node may communicate with various UEs 115 (such as half-duplex UEs 115). For example, an IAB node 205 (such as an IAB donor or an IAB parent node) may control or operate multiple other IAB nodes 104 and one or more of the multiple IAB nodes 104 may support full-duplex operation. For example, the parent node 205 may control or operate a first IAB node 104 that is capable of transmitting downlink signaling to a first UE 115 and simultaneously receiving uplink signaling from a second UE 115 and may control or operate a second IAB node 104 that is capable of transmitting downlink signaling to a third UE 115 and simultaneously receiving uplink signaling from a fourth UE 115. In such deployments, the first and second IAB nodes 104 may experience CLI from each other or self-interference, or both. In some aspects, the IAB nodes 104 may support a conditional duplexing capability. Additionally, or alternatively, the IAB nodes 104 may support single frequency full-duplex and FDM or space division multiplexing (SDM) with a resource block group (RBG) granularity.

In some aspects, a network entity 105, one or more TRPs, and a UE 115 may support various evaluation techniques and performance evaluation metrics associated with different deployment scenarios for full-duplex operation (such as for NR duplexing). Further, a network entity 105, one or more TRPs, and a UE 115 may support one or more techniques to support co-existence with other systems in any co-channels or adjacent channels for subband non-overlapping full-duplex operation or for dynamic or flexible TDD, or for both. For example, a network entity 105, one or more TRPs, and a UE 115 may support techniques associated with duplex operation evolution for NR TDD across various spectrums, including in an unpaired spectrum. In such examples, the network entity 105 (via the one or more TRPs) may support full-duplex operation, a UE 115 may support half-duplex operation, and the network entity 105 and the UE 115 may configure or expect no restrictions on which frequency ranges are available for use.

Such techniques may include various full-duplex types or schemes and corresponding metrics to evaluate a performance of such full-duplex types or schemes, inter-network entity 105 and inter-UE 115 CLI mitigation techniques, intra-subband CLI and inter-subband CLI mitigation techniques (such as in the implementation of subband non-overlapping full-duplex), or a metric-based evaluation procedure for an impact of full-duplex operation on half-duplex operation (assuming co-existence in co-channel and adjacent channels). Additionally, or alternatively, such techniques may include a metric-based evaluation procedure for an impact on RF constraints considering adjacent channel co-existence or for an impact on RF constraints considering self-interference, inter-subband CLI and inter-operator CLI at network entities 105, and inter-subband CLI and inter-operator CLI at UEs 115. Further, such techniques may include antenna or RF and algorithm design for interference mitigation, including antenna isolation, transmission interference management suppression in a receive-side part, filtering, and digital interference suppression. Further, such techniques may comply with one or more regulatory or network specifications associated with full-duplex operation in TDD unpaired spectrums.

In some aspects, various devices within a system may support a signaling mechanism to inform a UE 115 of the time or frequency location of subbands that a network entity 105 may use for full-duplex operation, such as for SBFD operation. Further, various devices may support a specific resource allocation in symbols or slots with subbands that a network entity 105 may use for full-duplex operation, such as SBFD operation.

The multiplexing modes 200, 201, and 202 may support various types of resource management and various types of multiplexing. For example, a multiplexing mode 200-*a* and a multiplexing mode 200-*b* may illustrate TDM. The multiplexing mode 200-*a* may illustrate DU transmission and reception and the multiplexing mode 200-*b* may illustrate MT transmission and reception. In the examples of the multiplexing mode 200-*a* and the multiplexing mode 200-*b*, MT downlink or uplink may use a first set of time domain resources and DU downlink or uplink may use a second set of (non-overlapping) time domain resources.

The multiplexing mode 201-*a* and the multiplexing mode 201-*b* may illustrate SDM reception and SDM transmission, respectively. For example, the multiplexing mode 201-*a* illustrates MT reception and DU reception (which may occur using overlapping or non-overlapping time or frequency resources) and the multiplexing mode 201-*b* illustrates MT transmission and DU transmission (which may occur using overlapping or non-overlapping time or frequency resources). The multiplexing mode 202-*a* and the multiplexing mode 202-*b* illustrate example full-duplex scenarios. For example, the multiplexing mode 202-*a* illustrates MT transmission and DU reception (which may occur using overlapping or non-overlapping time or frequency resources) and the multiplexing mode 202-*b* illustrates MT reception and DU transmission (which may occur using overlapping or non-overlapping time or frequency resources).

In any SDM or full-duplex scenarios, communication may occur simultaneously or at different times and may occur using different frequency resources, using partially overlapping frequency resources, or using the same frequency resources. For example, various devices or components may communicate MT downlink or uplink and DU downlink or uplink using non-overlapping frequency resources (e.g., in an FDM scheme), using partially overlapping frequency resources, or using fully overlapping frequency resources. Further, various devices or components may use any combination of MT downlink or uplink and DU downlink or uplink across different RB sets or different subbands. Further, various devices or components may support switching across different configurations over time (e.g., slot by slot).

Figure 3:
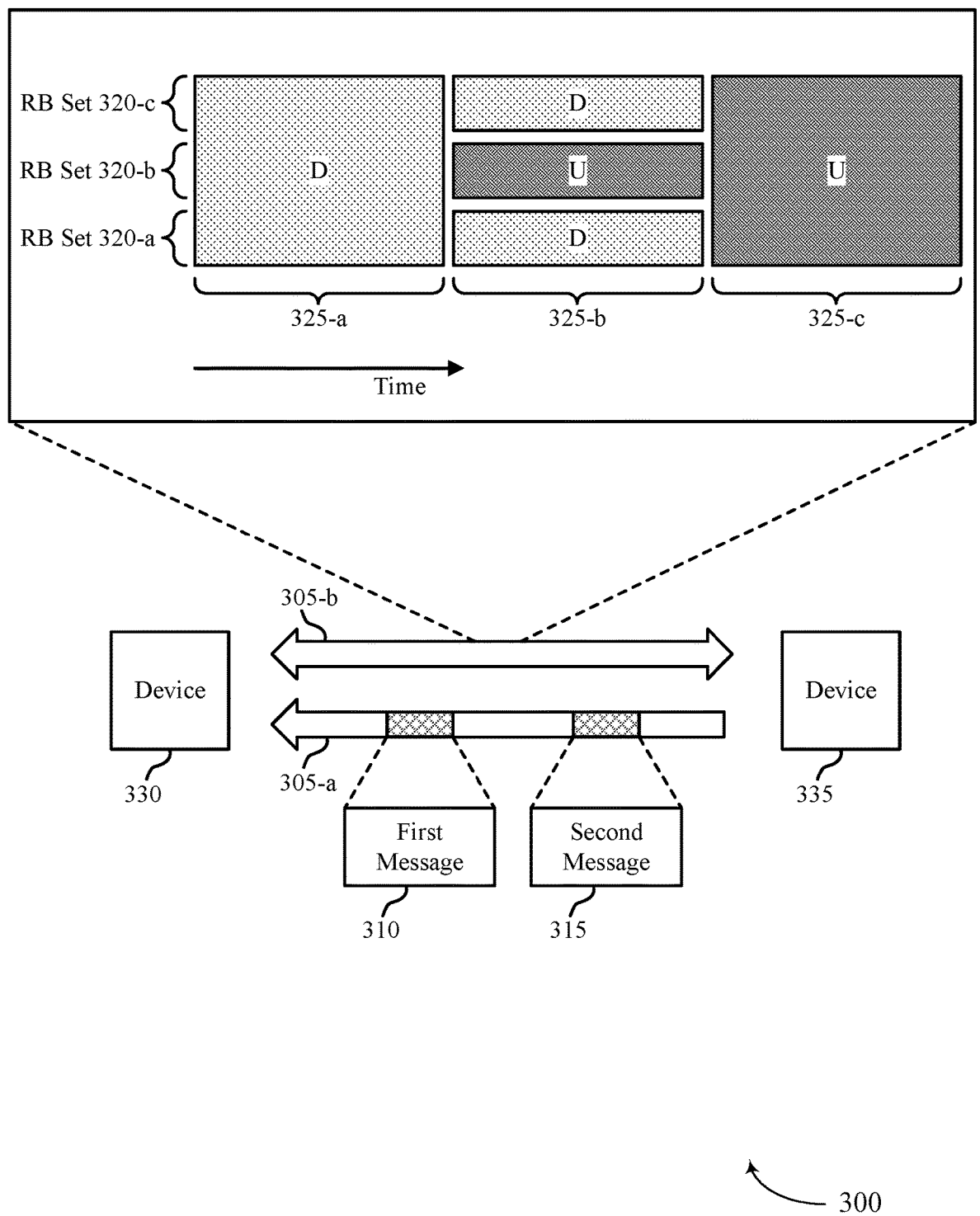
FIG. 3 shows an example signaling diagram that supports techniques for slot format configuration per RB set for subband full-duplex operation in accordance with one or more aspects of the present disclosure.

FIG. 3 shows an example signaling diagram 300 that supports techniques for slot format configuration per RB set for subband full-duplex operation in accordance with one or more aspects of the present disclosure. The signaling diagram 300 may implement or be implemented to realize or facilitate aspects of the wireless communications system 100 or any one or more of the multiplexing modes 200, 201, and 202. For example, the signaling diagram 300 illustrates communication between a device 330 and a device 335. In some implementations, the device 330 and the device 335 may support one or more signaling-based mechanisms according to which the device 335 may inform the device 330 of which time and frequency resources may be used for full-duplex communication via per RB set slot format configurations.

For example, in some deployment scenarios (e.g., IAB deployment scenarios), the device 330 and the device 335 may support a cell (e.g., a gNB-DU cell) resource configuration information element (IE) that indicates various information relating to time and frequency domain resources that the cell may use. The cell resource configuration IE may indicate a slot format for a set of slots via a first set of fields. For example, the resource configuration IE may indicate a slot format for a set of slots via one or more of a DUF slot configuration item, a choice DUF slot configuration field, an explicit format field, and a DUF slot format index field (where the choice DUF slot configuration field, the explicit format field, and the DUF slot format index field may be included in the DUF slot configuration item). As an example, any one or more of such fields may indicate a slot format of 5 slots as DDDUU, where the first 3 slots are configured as downlink slots and the last 2 slots are configured as uplink slots.

The cell resource configuration IE may further define per slot time and frequency availability. For example, a second set of fields may define a first downlink slot as "hard," "not available (NA)," or "soft" and a third set of fields may define the first downlink slot. In some aspects, an RB set index 1 may be set to "hard" and an RB set index 2 may be set to "NA," from which point the configuration may continue to define time and frequency availability on a second (e.g., next or subsequent) slot. The second set of fields may include any one or more of a hard/soft/NA (HSNA) slot configuration item, an HSNA downlink field, an HSNA uplink field, and an HSNA flexible field (where the HSNA slot configuration item may include the HSNA downlink field, the HSNA uplink field, and the HSNA flexible field). The third set of fields may include any one or more of an RB set index field, a frequency-domain HSNA slot configuration item, a slot index field, an HSNA downlink field, an HSNA uplink field, and an HSNA flexible field (where the frequency-domain HSNA slot configuration item may include the slot index field, the HSNA downlink field, the HSNA uplink field, and the HSNA flexible field).

The device 330 and the device 335 may also support an RB set configuration IE, which may include or indicate an RB set configuration. In some aspects, the device 330 and the device 335 may support the RB set configuration IE if the gNB-DU is an IAB-DU (e.g., the RB set configuration IE may only be applicable or usable if the gNB-DU is an IAB-DU). The RB set configuration IE may include a presence field, a range field, and an IE type and reference field for each IE/group name field. For example, the RB set configuration IE may include a subcarrier spacing field that indicates a subcarrier spacing used as a reference for the RB set configuration. The RB set configuration IE may also include an RB set size field that indicates a number of physical RBs (PRBs) in each RB set. In some aspects, the RB set size field indicates a same size for all RB sets associated with the RB set configuration. The RB set configuration IE may also include a number of RB sets field that indicates a number of configured RB sets. The RB sets may be contiguous and non-overlapping (in frequency). A start RB index of the first RB set may be the lowest index of RB of the IAB-DU cell. A presence of each of the subcarrier spacing field, the RB set size field, and the number of RB sets field may be set to "M."

In some deployments (e.g., non-IAB deployments), the device 335 may be unable to use such an RB set configuration IE that is applicable for when the gNB-DU is an IAB-DU (e.g., an RB set configuration IE that may be sent via an F1 interface). As such, the device 335 may lack an efficient and granular signaling mechanism according to which the device 335 may inform the device 330 of which time and frequency resources may be used for full-duplex communication. Further, the device 330 and the device 335 may also lack an efficient mechanism according to which the device 330 and the device 335 may obtain a mutual understanding of what time and frequency resources are to be used as a guard band when one or both of the device 330 and the device 335 are communicating in accordance with a full-duplex communications mode.

Accordingly, in some implementations, the device 330 and the device 335 may support an extension from the F1 interface (e.g., an IAB deployment) to define an RB set-based SBFD configuration. For example, the device 330 and the device 335 may support a slot format configuration (of uplink, downlink, and flexible symbols) on a per RB set basis and may leverage such a slot format configuration on a per RB set basis to schedule full-duplex communication at one or both of the device 330 and the device 335. The device 330 and the device 335 may communicate via a communication link 305, which may be shown as a communication link 305-*a* via which the device 330 receives signaling from the device 335 and a communication link 305-*b* via which the device 330 and the device 335 may communicate bi-directionally for illustrative purposes.

In support or facilitate the per RB set slot format configuration, the device 335 may transmit, to the device 330, a first message 310 that indicates or configures multiple RB sets 320 (which may refer to any one or more of an RB set 320-*a*, an RB set 320-*b*, and an RB set 320-*c*) for the device 330. The first message 310 may indicate unique identifying information for each of the multiple RB sets 320. In some implementations, for example, the first message 310 may indicate a starting RB index and an ending RB index for each of the multiple RB sets 320. Additionally, or alternatively, the first message 310 may indicate a starting RB index and an indication of a bandwidth (such as a quantity of PRBs) for each of the multiple RB sets 320.

As such, the device 330 and the device 335 may support an RB set configuration via the first message 310, which may be a modified version of an RB set configuration that the device 335 may use in an IAB deployment scenario. Such modifications may include adding or modifying one or more fields such that the device 335 is able to configure RB sets 320 of different sizes (such that different RB sets 320 may include different quantities of PRBs) and able to configure an RB index to place an RB set 320 arbitrarily within a bandwidth (e.g., an active bandwidth allocated for the device 330).

The device 335 may transmit a second message 315 to the device 330 to indicate a slot format for at least one RB set 320 of the multiple RB sets 320. As described herein, a slot format may be equivalently referred to or understood as a TDD pattern or configuration. For example, the second message 315 may include an IE container that indicates or otherwise conveys a TDD slot format pattern for at least one RB set 320 of the multiple RB sets 320. In some implementations, the IE container in the second message 315 may be a DUF slot configuration item that indicates one or more TDD slot format patterns. As such, the device 335 may configure multiple RB sets 320 via the first message 310, each associated with at least one identifying index, and, for each if not all of the multiple RB sets 320, the device 335 may indicate or define a per symbol or sot downlink, uplink, or flexible format via the second message 315. The first message 310 and the second message 315 may be conveyed via same signaling or via different signaling.

For example, and as illustrated by the signaling diagram 300, the second message 315 may indicate a first slot format of "DDDDDDDDDDDUUUUU" for a first index corresponding to the RB set 320-*a*, a second slot format of "DDDDD-UUUUUUUUUU" for a second index corresponding to the RB set 320-*b*, and a third slot format of "DDDDDDDDDD-UUUUU" for a third index corresponding to the RB set 320-*c*, where each "D" or "U" indicates that a corresponding symbol or slot is allocated for downlink communication or uplink communication, respectively. As such, each of the RB set 320-*a*, the RB set 320-*b* and the RB set 320-*c* may be allocated for downlink communication during a first time interval 325-*a* (which may include 5 symbols or slots). During a second time interval 325-*b* (which may include 5 symbols or slots), the RB set 320-*a* and the RB set 320-*c* may be allocated for downlink communication and the RB set 320-*b* may be allocated for uplink communication. During the third time interval 325-*c* (which may include 5 symbols or slots), each of the RB set 320-*a*, the RB set 320-*b* and the RB set 320-*c* may be allocated for uplink communication.

As such, via the per RB set slot format configuration, the device 335 may inform the device 330 that full-duplex communication, such as SBFD communication, is scheduled for the second time interval 325-*b*. In some aspects, an uplink or downlink subband may include one RB set 320. In some other aspects, an uplink or downlink subband may include multiple RB sets 320. For example, the device 335 may configure each RB set 320 with a relatively small quantity of RBs such that multiple RB sets 320 are within a single subband.

In some scenarios, the device 335 may transmit a third message to the device 330 that indicates a baseline slot format for the bandwidth including the multiple RB sets 320. Such a baseline slot format may be referred to or understood as an underlying or common TDD configuration or pattern, where "baseline" or "common" may refer to how the TDD configuration or pattern is equally or commonly applicable to all RB sets 320 (and is not, for example, specific to any one RB set 320). In scenarios in which the device 330 is provided with both a baseline slot format (e.g., an underlying TDD configuration) and one or multiple RB set-specific (e.g., subband-specific) TDD patterns, the device 330 and the device 335 may support one of various implementations relating to how the multiple TDD patterns interact.

In some implementations, if, for a given RB set 320 and a given slot, no RB set-specific TDD pattern is indicated (e.g., via the second message 315), the device 330 and the device 335 may use the underlying common TDD pattern. As such, the device 330 and the device 335 may support more efficient signaling by allowing the device 335 to avoid indicating an RB set-specific TDD pattern for all slots. In other words, the device 335 may skip indicating RB set-specific TDD patterns for some slots during which the underlying TDD pattern is sufficient. For example, and in the context of the illustration in the signaling diagram 300, the device 335 may indicate a baseline TDD pattern of "DDDDDDDDDDUUUUU" and may indicate a TDD pattern of "UUUUU" for a middle N slots or symbols of the RB set 320-*b*. In such implementations, the device 330 and the device 335 may communicate using the baseline TDD pattern outside of the middle N slots or symbols of the RB set 320-*b* and may communicate using the RB set-specific TDD pattern of "UUUUU" for the middle N slots or symbols of the RB set 320-*b*.

In some other implementations, the device 330 and the device 335 may support either a defined rule or a signaling mechanism according to which the device 330 and the device 335 may determine how to handle multiple TDD patterns for overlapping resources. In examples in which the device 330 and the device 335 support a defined rule, the defined rule may specify that an RB set-specific TDD pattern overwrites the common underlying TDD pattern for that slot and that RB set 320. In other words, the device 330 and the device 335 may expect that a slot format indicted by the second message 315 supersedes or overwrites a baseline slot format (e.g., a common underlying TDD pattern) for the RB set 320 for which the slot format was indicated. The defined rule may be dynamically, semi-statically, or statically signaled or may be predefined (e.g., in a memory). In examples in which the device 330 and the device 335 support a signaling mechanism, the device 335 (e.g., a gNB or DU) may have a choice to select between an RB set-specific TDD pattern and a baseline TDD pattern and may transmit a message (e.g., a fourth message) to indicate the selection to the device 330. In other words, the device 335 may select one of an RB set-specific TDD pattern or a baseline TDD pattern for a given slot and a given RB set 320 and may transmit a fourth message to indicate the selection to the device 330.

As such, the device 330 and the device 335 may leverage RB set-specific slot format configurations to indicate which time or frequency resources are scheduled for full-duplex communication and select between an RB set-specific slot format or a baseline slot format in a same manner. Such signaling mechanisms may facilitate greater adoption of full-duplex communication and simplify a scheduling of full-duplex communication.

In some aspects, full-duplex communication may result in or otherwise cause self-interference at one or both of the device 330 and the device 335. Accordingly, in some implementations, the device 330 and the device 335 may further support one or more configuration- or signaling-based mechanisms according to which the device 330 and the device 335 may configure a guard band between frequency resources that are allocated for simultaneous uplink and downlink communication in line with RB set-specific slot format configurations. In other words, the device 330 and the device 335 may support guard band configurations according to which the device 330 and the device 335 may select or indicate guard band RBs during symbols or slots associated with full-duplex communication. Additional details relating to such guard band configurations are illustrated by and described with reference to FIGS. 4-6.

Further, the described techniques may be applicable to communication between various network nodes, components, or entities via various types of communication links or messages. For example, the second message 315 may be used for various types of signal (e.g., sent via various types of signaling) and the device 330 and the device 335 may be various types of devices or entities, such as a UE 115 or a network entity 105 (such as a gNB, a CU, or a DU).

For example, the second message 315 may be used for CU to DU F1 signaling for a CU to configure a subband configuration per cell to the DU. Additionally, or alternatively, the second message 315 may be used for DU to CU F1 signaling for a DU to report, for example, a preconfigured (e.g., via an operations, administration, and maintenance (OAM) entity) subband configuration to a new (such as recently acquired) connected CU. Additionally, or alternatively, the second message 315 may be used in RRC signaling for a gNB to semi-statically indicate a subband configuration to new UEs 115 (such as recently acquired UEs 115). Additionally, or alternatively, the second message 315 may be used in MAC control elements (MAC-CEs) or downlink control information (DCI) signaling for a gNB to dynamically indicate a subband configuration to new UEs 115 (such as recently acquired UEs 115). Additionally, or alternatively, the second message 315 may be used in broadcast system information block (SIB) signaling for a gNB to broadcast a subband configuration to new (such as recently acquired) idle UEs 115 (which may enable devices to avoid signaling SBFD subband location via dedicated signaling). Further, such signaling may apply to various other types of subband configuration methodology.

Figure 4:
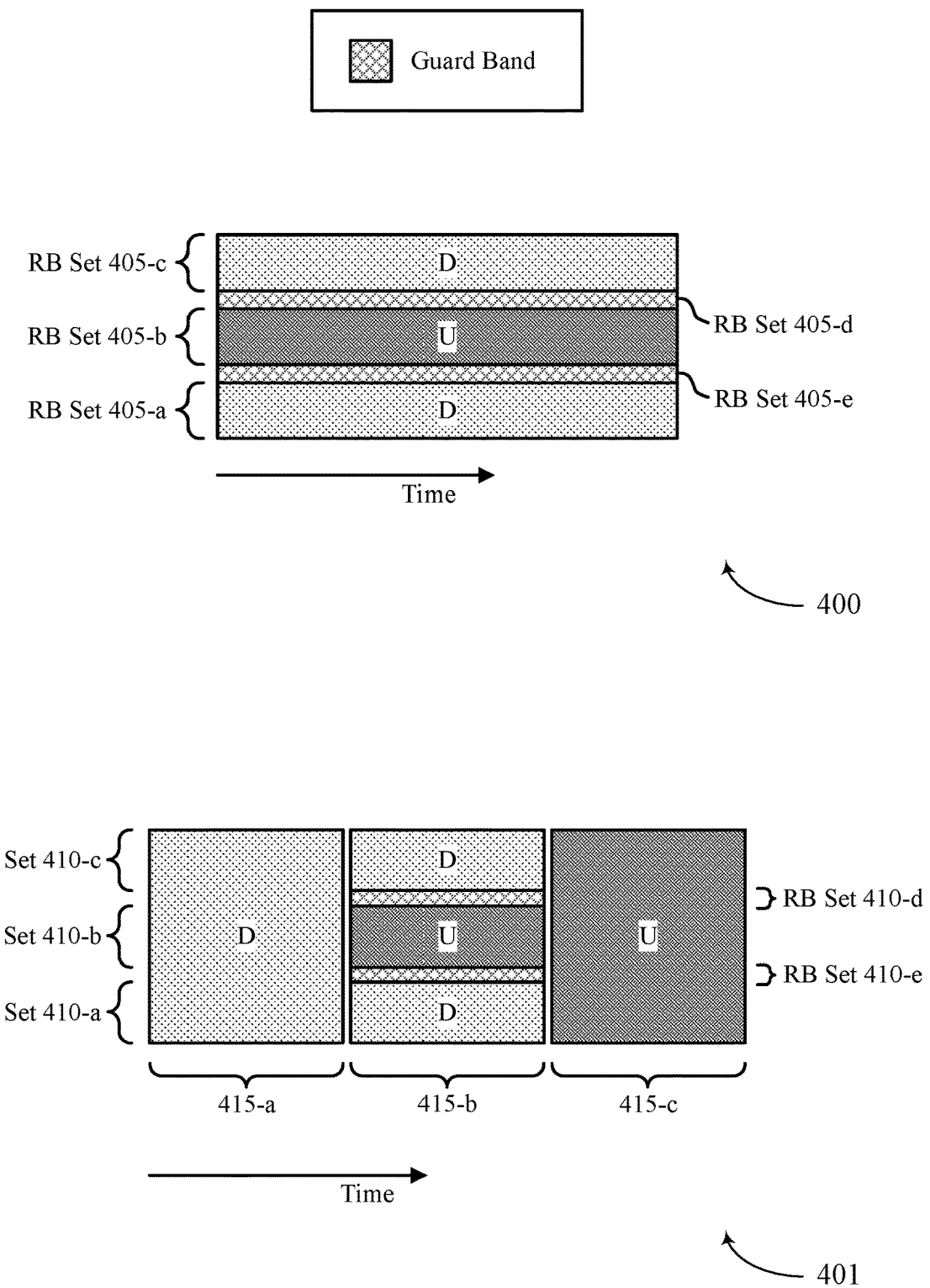
FIGS. 4, 5, and 6 show example guard band configurations that support techniques for slot format configuration per RB set for subband full-duplex operation in accordance with one or more aspects of the present disclosure.

FIG. 4 shows example guard band configurations 400 and 401 that support techniques for slot format configuration per RB set for subband full-duplex operation in accordance with one or more aspects of the present disclosure. The guard band configurations 400 and 401 may implement or be implanted to realize aspects of the wireless communications system 100, any one or more of the multiplexing modes 200, 201, and 202, or the signaling diagram 300. For example, a device 330 and a device 335 may employ the guard band configurations 400 and 401 to add a guard band between frequency resources that are allocated for simultaneous uplink and downlink communication in line with RB set-specific slot format configurations.

In accordance with the guard band configurations 400 and 401, the device 330 and the network entity may define one or more relatively narrower RB sets that represent guard band RBs between each downlink and uplink subband. A slot format associated with such a narrow guard band RB set may include "NA" values or a bitmap (where a first bit, such as a 0 bit, indicates that a corresponding slot or symbol is available for use and a second bit, such as a 1 bit, indicates that a corresponding sot or symbol is unavailable for use).

For example, and as illustrated by the guard band configuration 400, the device 330 and the device 335 may support RB set-specific slot format configurations for multiple RB sets 405, including an RB set 405-a, an RB set 405-b, an RB set 405-c, an RB set 405-d, and an RB set 405-e. The network entity may indicate (e.g., via the second message 315) a first slot format configuration of "DDDDD" for a first index corresponding to the RB set 405-a, a second slot format configuration of "UUUUU" for a second index corresponding to the RB set 405-b, and a third slot format configuration of "DDDDD" for a third index corresponding to the RB set 405-c. To indicate guard bands between the RB set 405-a, the RB set 405-b, and the RB set 405-c, the device 335 may indicate (e.g., via the second message 315) a slot format of "NA . . . NA" or "11111" for a fourth index corresponding to the RB set 405-d and another slot format of "NA . . . NA" or "11111" for a fifth index corresponding to the RB set 405-e. Such slot formats of "NA . . . NA" or "11111" may indicate that the RBs of the RB set 405-d and the RB set 405-e are unavailable for communications and function as a guard band for full-duplex communication.

For further example, and as illustrated by the guard band configuration 401, the device 330 and the device 335 may support RB set-specific slot format configurations for multiple RB sets 410, including an RB set 410-a, an RB set 410-b, an RB set 410-c, an RB set 410-d, and an RB set 410-e. The network entity may indicate (e.g., via the second message 315) a first slot format of "DDDDDDDDDD-UUUUU" for a first index corresponding to the RB set 410-a, a second slot format of "DDDDDUUUUUUUUUU" for a second index corresponding to the RB set 410-b, and a third slot format of "DDDDDDDDDDUUUUU" for a third index corresponding to the RB set 410-c. As such, each of the RB set 410-a, the RB set 410-b and the RB set 410-c may be allocated for downlink communication during a first time interval 415-a (which may include 5 symbols or slots). During a second time interval 415-b (which may include 5 symbols or slots), the RB set 410-a and the RB set 410-c may be allocated for downlink communication and the RB set 410-b may be allocated for uplink communication. During the third time interval 415-c (which may include 5 symbols or slots), each of the RB set 410-a, the RB set 410-b and the RB set 410-c may be allocated for uplink communication.

The device 335 may further indicate (e.g., via the second message) a slot format of "DDDDDNA . . . NAUUUUU" or "000001111100000" for a fourth index corresponding to the RB set 410-d and another slot format of "DDDDDNA . . . NAUUUUU" or "000001111100000" for a fifth index corresponding to the RB set 410-e. Such slot formats of "NA . . . NA" or "11111" may indicate that the RBs of the RB set 410-d and the RB set 410-e are unavailable for communications and function as a guard band for full-duplex communication. As such, the device 330 and the device 335 may use the RB set 410-d and the RB set 410-e as guard bands during the second time interval 415-b, but may otherwise use the RB set 410-d and the RB set 410-e for communication (such as during the first time interval 415-a and the third time interval 415-c).

Figure 5:
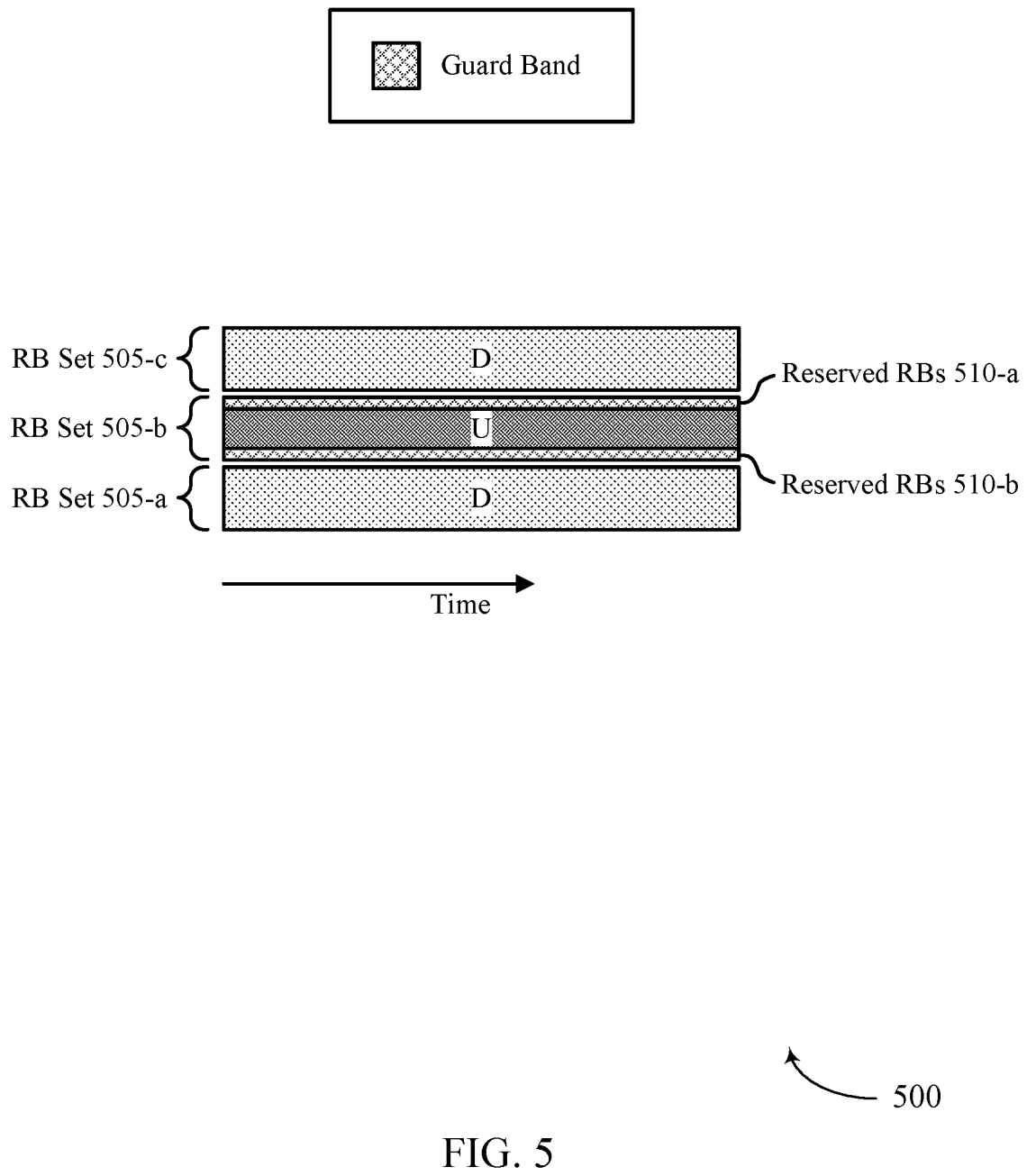

FIG. 5 shows an example guard band configuration 500 that supports techniques for slot format configuration per RB set for subband full-duplex operation in accordance with one or more aspects of the present disclosure. The guard band configuration 500 may implement or be implanted to realize aspects of the wireless communications system 100, any one or more of the multiplexing modes 200, 201, and 202, or the signaling diagram 300. For example, a device 330 and a device 335 may employ the guard band configuration 500 to add a guard band between frequency resources that are allocated for simultaneous uplink and downlink communication in line with RB set-specific slot format configurations.

In some implementations, the device 335 may explicitly signal one or more guard bands to use between RB sets associated with different transmission directions. For example, the device 335 may indicate a value N, which may be a configurable value, and a quantity of N RBs may accordingly be left unused when applicable (e.g., when adjacent RB sets are allocated for uplink and downlink, respectively, during an at least partially overlapping time interval). For example, a CU entity may indicate N to a DU entity, and the DU entity may leave N RBs as a guard band when applicable.

Additionally, or alternatively, the device 330 and the device 335 may support a defined rule (such as a dynamically, semi-statically, or statically indicated rule or a rule provided by a network specification) to indicate that the device 330 and the device 335 are to borrow N RBs in between each downlink and uplink subband from either or both of a downlink RB set or an uplink RB set as guard band(s) on the associated SBFD symbols or slots. N may be indicated from the device 335 (and configurable), may be a fixed value, or may be a function of, for example, a size of the subband from which the RBs are reserved.

For example, and as illustrated by the guard band configuration 500, an RB set 505-a may be configured for downlink communication, an RB set 505-b may be configured for uplink communication, and an RB set 505-c may be configured for downlink communication. As such, in some examples, the device 330 and the device 335 may reserve RBs from the RB set 505-b and refrain from using the reserved RBs for communication. For example, the device 330 and the device 335 may use a set of reserved RBs 510-a as a guard band between the RB set 505-b and the RB set 505-c and may use a set of reserved RBs 510-b as a guard band between the RB set 505-a and the RB set 505-b.

Further, although illustrated and described in the context of reserving RBs from the RB set 505-*b*, the device 330 and the device 335 may additionally, or alternatively, reserve RBs from one or both of the RB set 505-*a* and the RB set 505-*c*.

Figure 6:
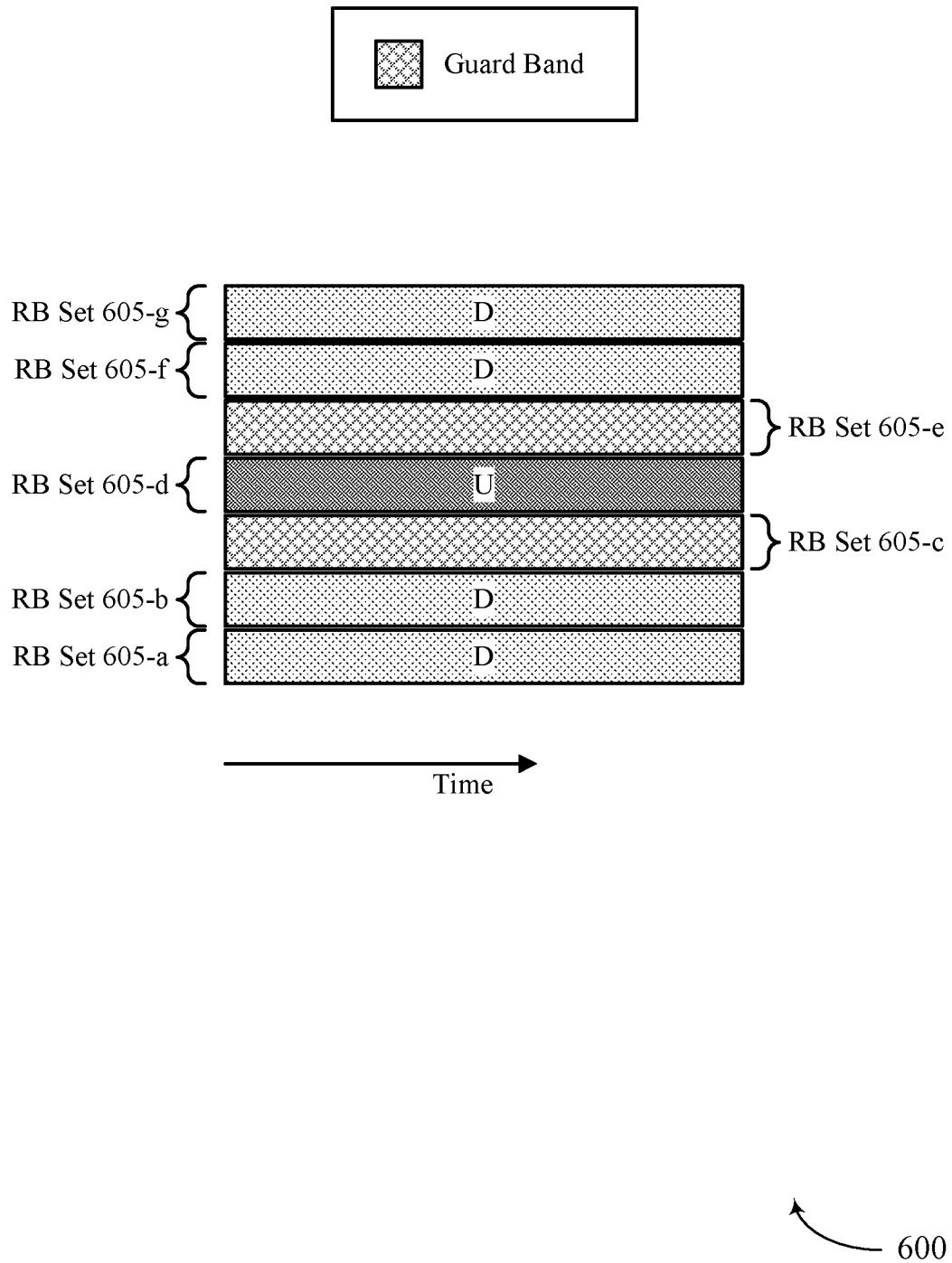

FIG. 6 shows an example guard band configuration 600 that supports techniques for slot format configuration per RB set for subband full-duplex operation in accordance with one or more aspects of the present disclosure. The guard band configuration 600 may implement or be implanted to realize aspects of the wireless communications system 100, any one or more of the multiplexing modes 200, 201, and 202, or the signaling diagram 300. For example, a device 330 and a device 335 may employ the guard band configuration 600 to add a guard band between frequency resources that are allocated for simultaneous uplink and downlink communication in line with RB set-specific slot format configurations.

In accordance with the guard band configuration 600, the device 330 and the device 335 may support a defined rule (such as a dynamically, semi-statically, or statically indicated rule or a rule provided by a network specification) that specifies how RB sets for downlink and uplink subbands may be explicitly indicated and that RB sets not signaled (e.g., RB sets for which an RB set-specific slot format is not signaled) may be implicitly indicated as guard bands on the associated SBFD symbols or slots. In some aspects, the guard band configuration 600 may be used in scenarios in which a subband includes multiple RB sets.

For example, and as illustrated by the guard band configuration 600, an RB set 605-*a* may be configured for downlink communication, an RB set 605-*b* may be configured for downlink communication, an RB set 605-*c* may not be configured for either uplink or downlink communication, an RB set 605-*d* may be configured for uplink communication, an RB set 605-*e* may not be configured for either uplink or downlink communication, an RB set 605-*f* may be configured for downlink communication, and an RB set 605-*g* may be configured for downlink communication. As such, the device 330 and the device 335 may use the RB set 605-*c* and the RB set 605-*e* as guard bands between uplink and downlink subbands in accordance with the RB set 605-*c* and the RB set 605-*e* not being explicitly configured for one of uplink or downlink communication.

Additionally, or alternatively, the device 330 and the device 335 may support a defined rule (such as a dynamically, semi-statically, or statically indicated rule or a rule provided by a network specification) that specifies that if two adjacent RB sets 605 have different downlink and uplink directions, the device 330 and the device 335 add N RBs as a guard band (e.g., without additional signaling). Otherwise, if two adjacent RB sets 605 have the same downlink or uplink direction, the device 330 and the network entity may ignore the configured N RBs as a guard band.

Figure 7:
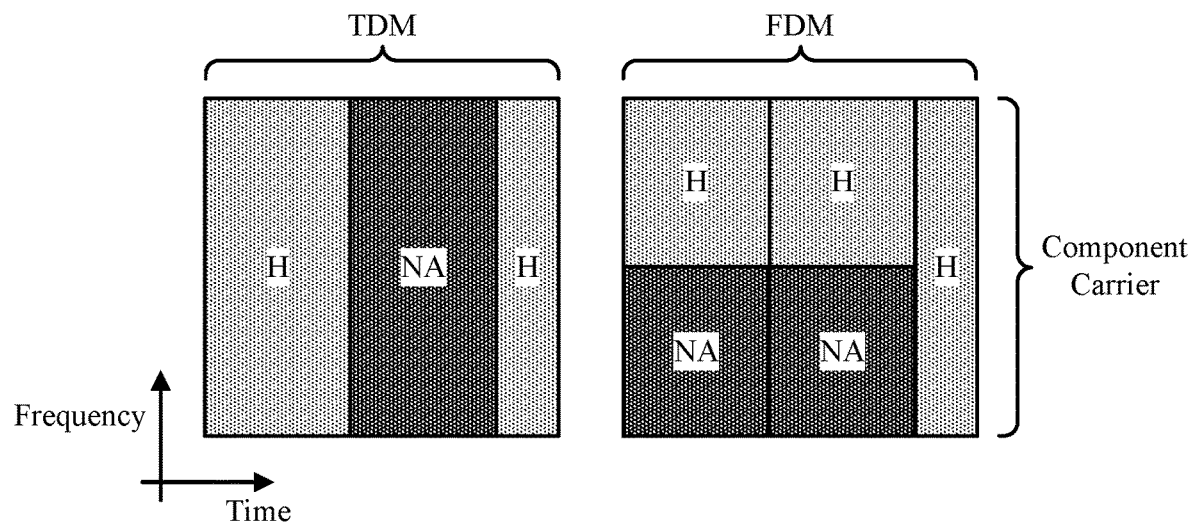
FIG. 7 shows example multiplexing modes that support techniques for slot format configuration per RB set for subband full-duplex operation in accordance with one or more aspects of the present disclosure.
Figure 7:
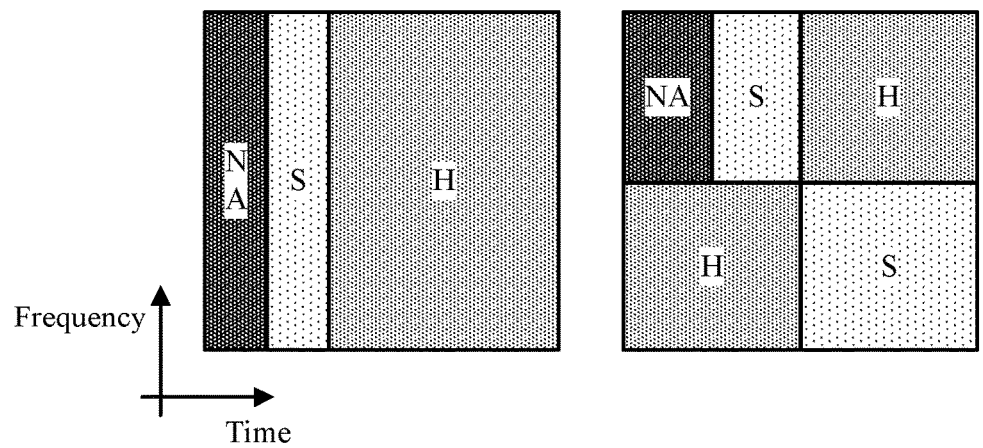

FIG. 7 shows example multiplexing modes 700 that supports techniques for slot format configuration per RB set for subband full-duplex operation in accordance with one or more aspects of the present disclosure. The multiplexing modes 700 may implement or be implemented to realize or facilitate aspects of the wireless communications system 100, any one or more of the multiplexing modes 200, 201, and 202, the signaling diagram 300, or any one or more of the guard band configurations 400, 500, or 600. For example, a device 330 and a device 335 may employ aspects, if not an entirety, of the multiplexing modes 700 to support RB set-specific slot format configurations.

For example, the multiplexing modes 700 illustrate a TDM mode and an FDM mode according to which devices in specific deployment scenarios (e.g., IAB deployment scenarios) may communicate. The multiplexing modes 700 include various types of resources, including "hard" resources 705 (which may be available for use), "NA" resources 710 (which may not be available for use), and "soft" resources 715 (which may be conditionally available for use).

In a first step associated with the multiplexing modes 700, an IAB node may report an (MT/DU) duplexing capability to a CU entity (and via CU entity to a parent node). At a second step, the CU entity may determine or select resource configurations for the IAB node and the parent. At a third step, the IAB node and the parent node may exchange (optional) information to facilitate enhanced duplexing. Such information may include a timing mode (via uplink), a timing mode indication (via downlink), a requested downlink transmit power adjustment (via uplink), a provided downlink transmit power adjustment (via downlink), a requested uplink transmit power (via uplink), a recommend one or more beams for an MT (via uplink), and a set of restricted beams for a DU (via downlink).

Figure 8:
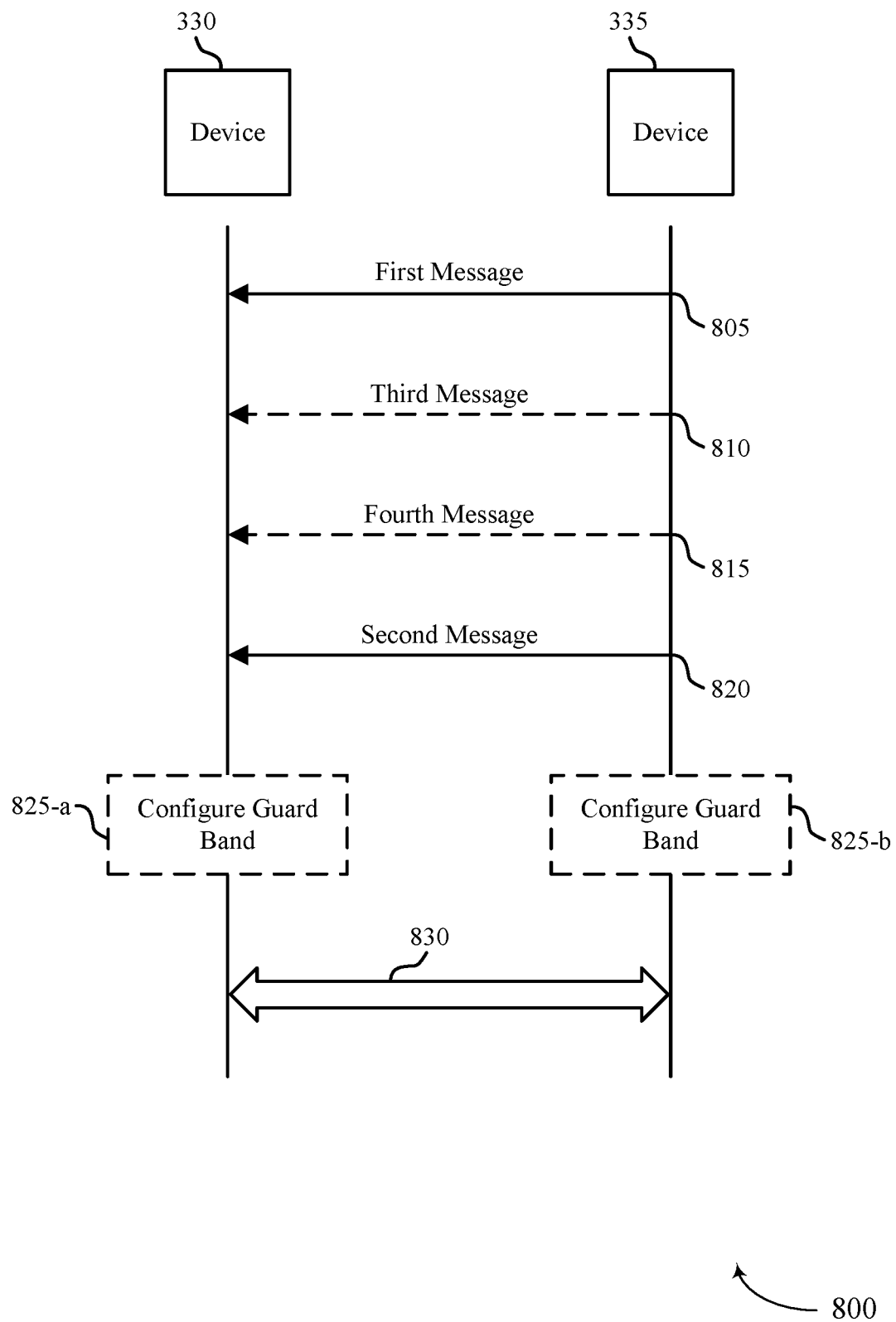
FIG. 8 shows an example process flow that supports techniques for slot format configuration per RB set for subband full-duplex operation in accordance with one or more aspects of the present disclosure.

FIG. 8 shows an example process flow 800 that supports techniques for slot format configuration per RB set for subband full-duplex operation in accordance with one or more aspects of the present disclosure. The process flow 800 may implement or be implemented to realize or facilitate aspects of the wireless communications system 100, any one or more of the multiplexing modes 200, 201, and 202, the signaling diagram 300, any one or more of the guard band configurations 400, 500, or 600, or the multiplexing modes 700. For example, the process flow 800 illustrates communication between a device 330 and a device 335, which may be examples of corresponding devices illustrated by and described with reference to FIGS. 1-7.

In the following description of the process flow 800, the operations may be performed (such as reported or provided) in a different order than the order shown, or the operations performed by the example devices may be performed in different orders or at different times. For example, specific operations also may be left out of the process flow 800, or other operations may be added to the process flow 800. Further, although some operations or signaling may be shown to occur at different times for discussion purposes, these operations may actually occur at the same time. Further, the signaling illustrated by and described with reference to FIG. 8 may include one or more uplink control information (UCI) messages, one or more DCI messages, RRC signaling, one or more MAC-CEs, or one or more data messages, or any combination thereof.

At 805, the device 330 may receive or obtain a first message that indicates multiple RB sets and that indicates multiple indexes corresponding to the multiple RB sets. For example, the device 330 may receive an RB set configuration that indicates unique identifying information associated with each of the multiple RB sets. Such unique identifying information includes at least one index, which may be a starting index or an ending index, or both. Such unique identifying information may also include a bandwidth indication, such as an indication of a quantity of RBs, within each respective RB set (such that different RB sets may have different sizes).

At 810, the device 330 may, in some implementations, receive or obtain a third message that indicates a baseline slot format for a bandwidth including the multiple RB sets. Such a baseline slot format may be referred to herein as a baseline, common, or underlying slot format or TDD pattern or configuration. In implementations in which the device 330 receives or obtains the third message, the device 330 and the device 335 may employ a mechanism according to which the device 330 and the device 335 determine which of an RB set-specific slot format or a baseline slot format supersedes or has priority.

At 815, the device 330 may, in some implementations, receive or obtain a fourth message that indicates whether a slot format indicated for a specific RB set is to overwrite the baseline slot format for the bandwidth.

At 820, the device 330 may receive or obtain a second message that indicates a slot format for an RB set, from the multiple RB sets. In some examples, the second message may indicate the slot format for the RB set via an index (or other unique identifying information) corresponding to the RB set. In some implementations, the second message may indicate a respective slot format for each respective RB set from the multiple RB sets and, as such, the device 335 may inform the device 330 of which time and frequency resources are scheduled for full-duplex communication.

At 825-*a* and 825-*b*, the device 330 and the device 335 may each configure a guard band to separate resources, in frequency, when full-duplex communication is scheduled. The device 330 and the device 335 may configure the guard band (or guard bands) in accordance with one or more guard band configurations, as illustrated by and described in more detail with reference to FIGS. 4-6.

At 830, the device 330 may communicate with (e.g., transmit to, receive from, output for transmission to, obtain from, or any combination thereof) the device 335 using at least the RB set in accordance with the slot format. The device 330 may also communicate with the device 335 using others of the multiple RB sets, either in accordance with RB set-specific slot format configurations received for each respective RB set or in accordance with a baseline slot format (if, for example, RB set-specific slot formats are not indicated for the remainder of the multiple RB sets).

Figure 9:
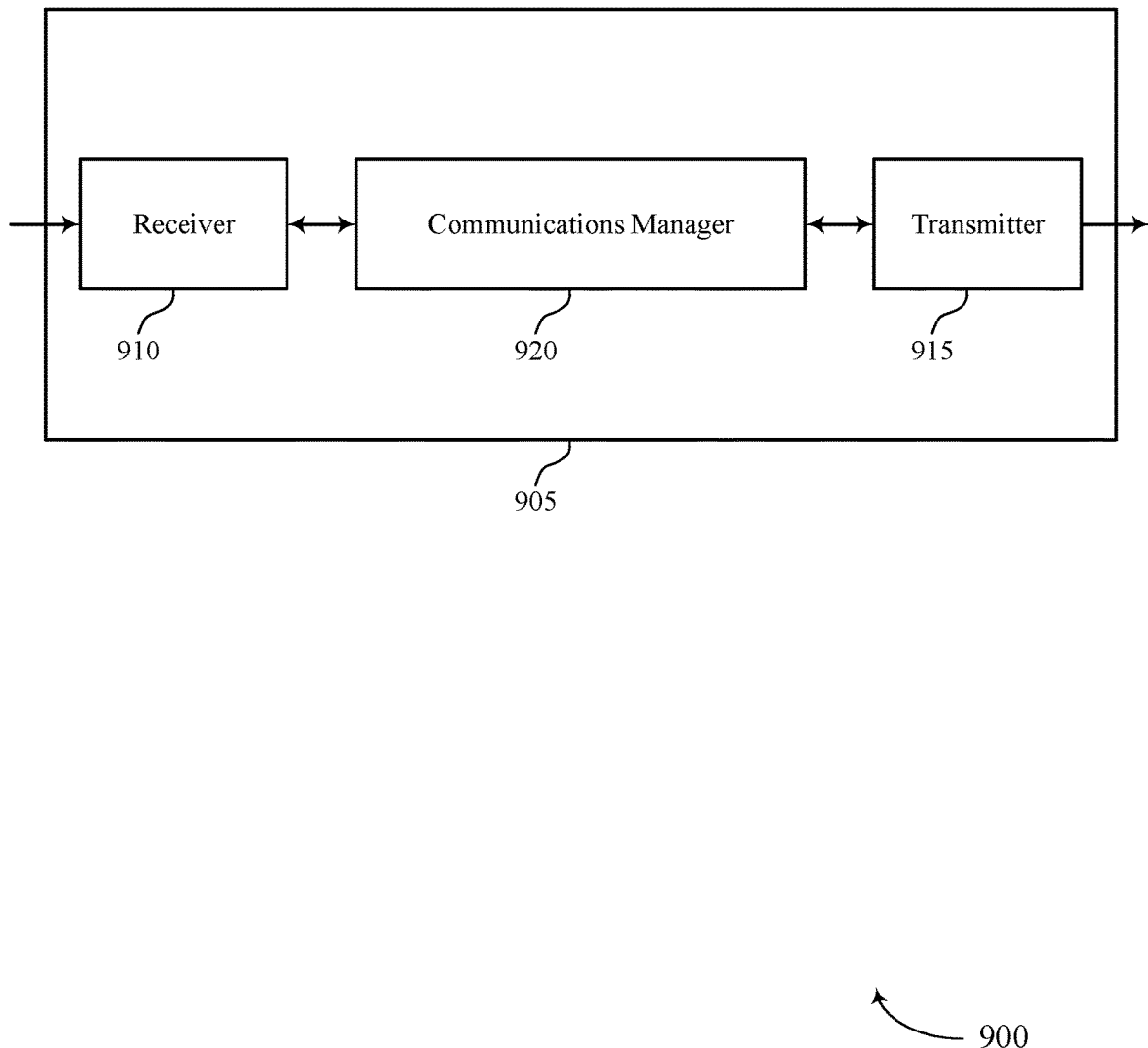
FIGS. 9 and 10 show block diagrams of devices that support techniques for slot format configuration per RB set for subband full-duplex operation in accordance with one or more aspects of the present disclosure.

FIG. 9 shows a block diagram 900 of a device 905 that supports techniques for slot format configuration per RB set for subband full-duplex operation in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for slot format configuration per RB set for subband full-duplex operation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for slot format configuration per RB set for subband full-duplex operation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for slot format configuration per RB set for subband full-duplex operation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for obtaining (e.g., receiving, identifying, ascertaining, selecting) a first message that indicates a set of multiple RB sets and that indicates a set of multiple indexes corresponding to the set of multiple RB sets. The communications manager 920 may be configured as or otherwise support a means for obtaining (e.g., receiving, identifying, ascertaining, selecting) a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set. The communications manager 920 may be configured as or otherwise support a means for communicating (e.g., transmitting or receiving, or both, via one or more transmitters, one or more receivers, or one or more transceivers) using the at least one RB set in accordance with the at least one slot format.

Additionally, or alternatively, the communications manager 920 may support wireless communication at a wireless node in accordance with examples as disclosed herein. For example, the communications manager 920 may be configured as or otherwise support a means for receiving a first message that indicates a set of multiple RB sets and that indicates a set of multiple indexes corresponding to the set of multiple RB sets. The communications manager 920 may be configured as or otherwise support a means for receiving a second message that includes at least one index corresponding to at least one RB set from the set of multiple RB sets and that indicates at least one slot format for the at least one RB set, where a respective slot format of the at least one slot format corresponds to a respective RB set of the at least one RB sett. The communications manager 920 may be configured as or otherwise support a means for communicating using the at least one RB set in accordance with the at least one slot format.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources.

Means for receiving or means for obtaining may include a receiver (such as the receiver 910 or a receive processor) or an antenna(s) of a network entity 105 or a receiver (such as the receiver 910 or a receive processor) or an antenna(s) of a UE 115, or of other devices illustrated and described herein. Means for transmitting or means for outputting may include a transmitter (such as the transmitter 915 or a transmit processor) or an antenna(s) of a network entity 105 or a transmitter (such as the transmitter 915 or a transmit processor) or an antenna(s) of a UE 115, or of other devices illustrated and described herein. Means for detecting, means for forwarding, means for determining, and/or means for performing may include a processing system, which may include one or more processors, such as the communications manager 920 or a processor 1240, a transmit MIMO processor, or a controller of a network entity 105 or a UE 115, or of other devices illustrated and described herein.

In some cases, rather than actually transmitting a frame or packet, a device may have an interface to output a frame for transmission (a means for outputting). For example, a processor may output a frame, via a bus interface, to an RF front end for transmission. Similarly, rather than actually receiving a frame, a device may have an interface to obtain a frame received from another device (a means for obtaining). For example, a processor may obtain (or receive) a frame, via a bus interface, from an RF front end for reception.

Figure 10:
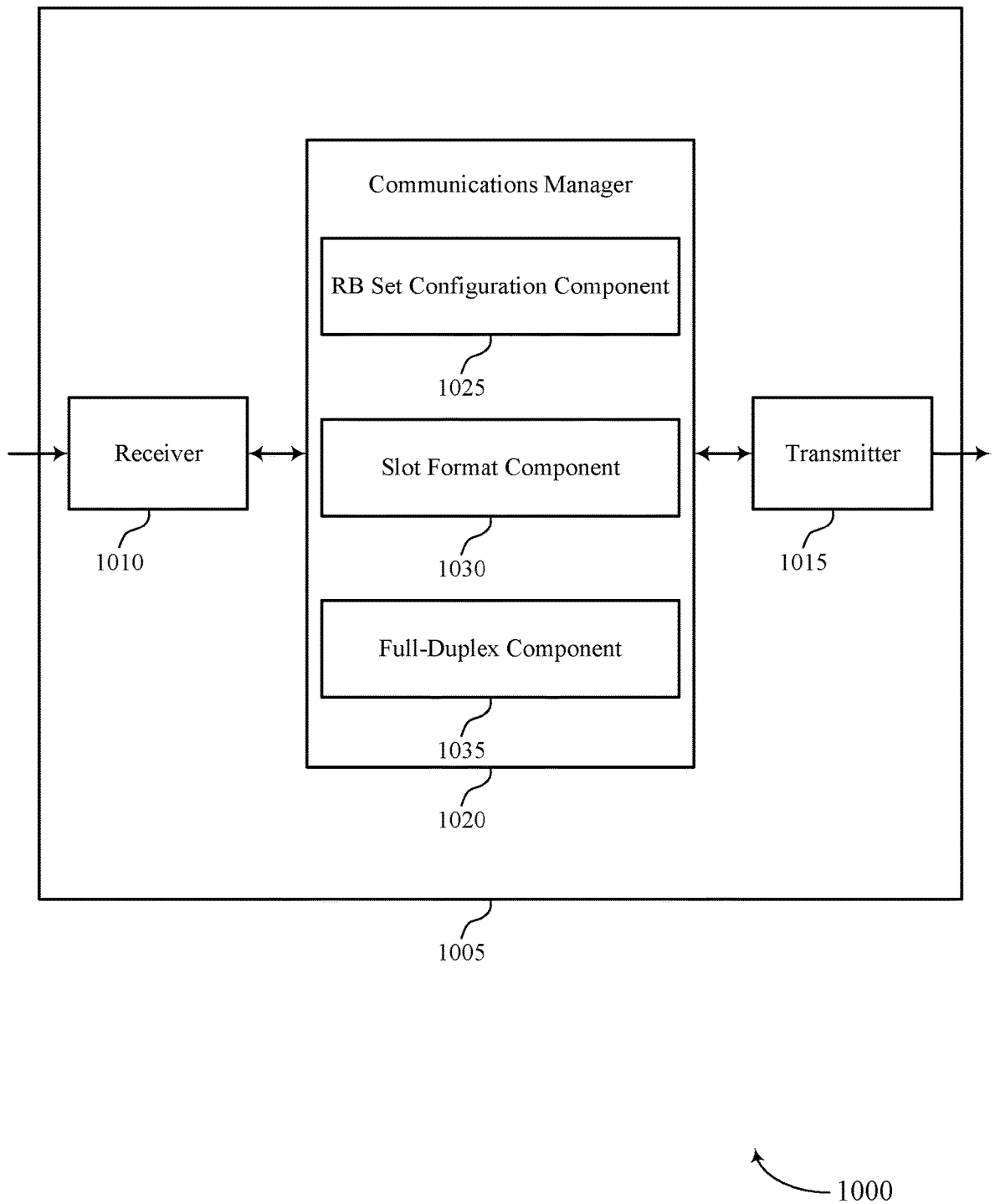

FIG. 10 shows a block diagram 1000 of a device 1005 that supports techniques for slot format configuration per RB set for subband full-duplex operation in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for slot format configuration per RB set for subband full-duplex operation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for slot format configuration per RB set for subband full-duplex operation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for slot format configuration per RB set for subband full-duplex operation as described herein. For example, the communications manager 1020 may include an RB set configuration component 1025, a slot format component 1030, a full-duplex component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The RB set configuration component 1025 may be configured as or otherwise support a means for obtaining (e.g., receiving, identifying, ascertaining, selecting) a first message that indicates a set of multiple RB sets and that indicates a set of multiple indexes corresponding to the set of multiple RB sets. The slot format component 1030 may be configured as or otherwise support a means for obtaining (e.g., receiving, identifying, ascertaining, selecting) a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set. The full-duplex component 1035 may be configured as or otherwise support a means for communicating using the at least one RB set in accordance with the at least one slot format.

Additionally, or alternatively, the communications manager 1020 may support wireless communication at a wireless node in accordance with examples as disclosed herein. The RB set configuration component 1025 may be configured as or otherwise support a means for receiving a first message that indicates a set of multiple RB sets and that indicates a set of multiple indexes corresponding to the set of multiple RB sets. The slot format component 1030 may be configured as or otherwise support a means for receiving a second message that includes at least one index corresponding to at least one RB set from the set of multiple RB sets and that indicates at least one slot format for the at least one RB set, where a respective slot format of the at least one slot format corresponds to a respective RB set of the at least one RB sett. The full-duplex component 1035 may be configured as or otherwise support a means for communicating using the at least one RB set in accordance with the at least one slot format.

Figure 11:
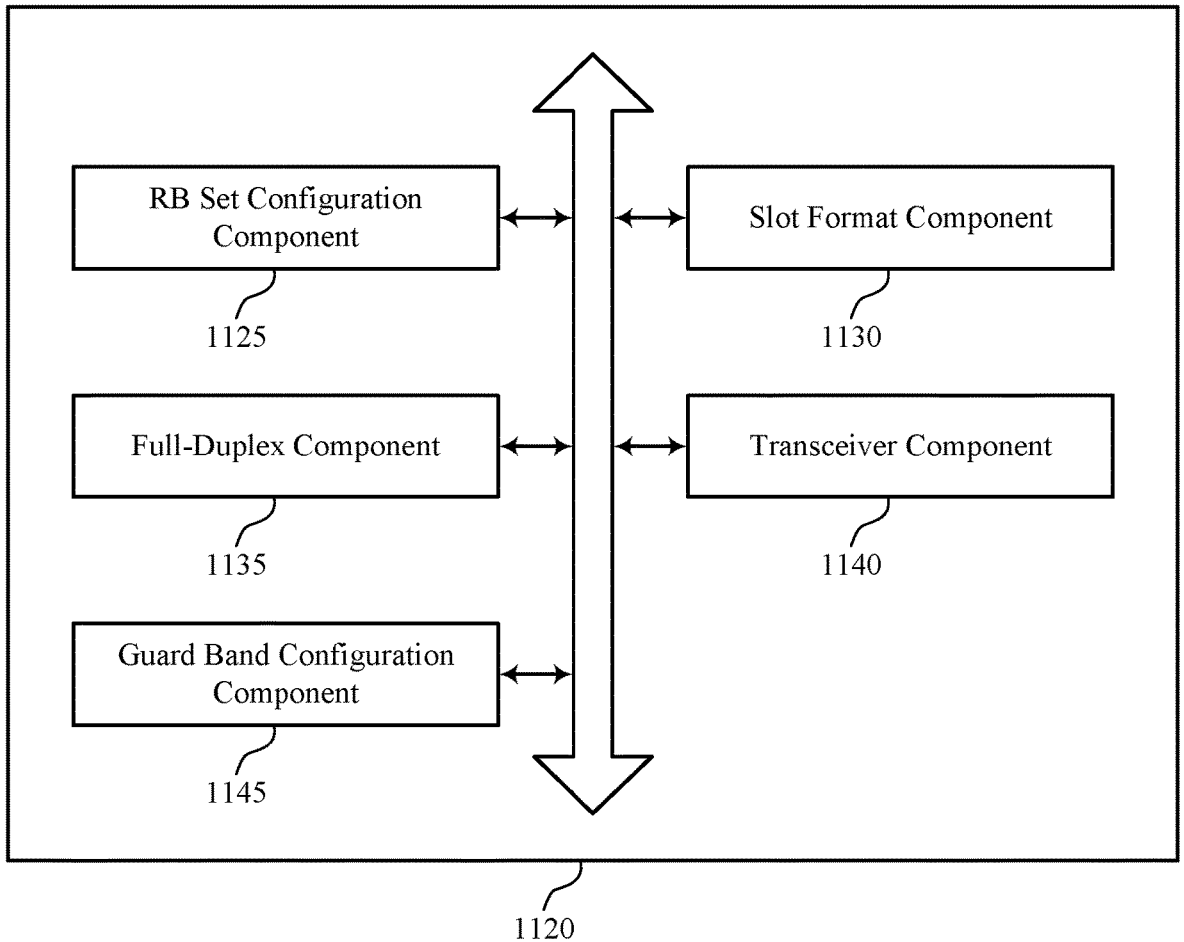
FIG. 11 shows a block diagram of a communications manager that supports techniques for slot format configuration per RB set for subband full-duplex operation in accordance with one or more aspects of the present disclosure.

FIG. 11 shows a block diagram 1100 of a communications manager 1120 that supports techniques for slot format configuration per RB set for subband full-duplex operation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for slot format configuration per RB set for subband full-duplex operation as described herein. For example, the communications manager 1120 may include an RB set configuration component 1125, a slot format component 1130, a full-duplex component 1135, a transceiver component 1140, a guard band configuration component 1145, or any combination thereof. Each of these components may communicate, directly or indirectly, with one another (e.g., via one or more buses).

Further, a component as described herein may be examples of means-plus-function components and may include one or more processors, processing systems, hardware and/or software components, controller, microcontroller, state machine, a DSP and a microprocessor, a plurality of microprocessors, one or more microprocessors in conjunction with a DSP core, programmable logic devices (PLDs), any other suitable circuitry, or any combination of circuits that may performed the various functionalities described throughout this disclosure.

The communications manager 1120 may support wireless communication at a UE in accordance with examples as disclosed herein. The RB set configuration component 1125 may be configured as or otherwise support a means for obtaining (e.g., receiving, identifying, ascertaining, selecting) a first message that indicates a set of multiple RB sets and that indicates a set of multiple indexes corresponding to the set of multiple RB sets. The slot format component 1130 may be configured as or otherwise support a means for obtaining (e.g., receiving, identifying, ascertaining, selecting) a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set. The full-duplex component 1135 may be configured as or otherwise support a means for communicating using the at least one RB set in accordance with the at least one slot format.

In some examples, the at least one slot format includes a set of multiple slot formats, the at least one RB set includes the set of multiple RB sets, each slot format from the set of multiple slot formats is associated with a respective RB set from the set of multiple RB sets, and the set of multiple slot formats includes a first slot format for a first RB set and a second slot format for a second RB set, the first RB set and the second RB set being from the set of multiple RB sets.

In some examples, the second message indicates a first sequence of communication directions for time domain resources associated with the first slot format and a second sequence of communication directions for time domain resources associated with the second slot format. In some examples, the first sequence of communication directions is different from the second sequence of communication directions. In some examples, the UE communicates in accordance with a full-duplex communication mode based on the first sequence of communication directions and the second sequence of communication directions.

In some examples, the first message or the second message, or both, further indicate a resource allocation for a guard band between the first RB set and the second RB set. In some examples, the first message and the second message are a same message or are different messages.

In some examples, the set of multiple slot formats includes a third slot format for a third RB set from the set of multiple RB sets. In some examples, the third slot format indicates that a portion of the third RB set is unavailable for communications when the first slot format and the second slot format indicate full-duplex operation. In some examples, the third RB set is the guard band.

In some examples, the third RB set is located between the first RB set and the second RB set.

In some examples, the guard band configuration component 1145 may be configured as or otherwise support a means for obtaining (e.g., receiving, identifying, ascertaining, selecting) an indication of a set of multiple RBs between the first RB set and the second RB set, where the set of multiple RBs is unavailable for communications when the first slot format and the second slot format indicate full-duplex operation, and where the set of multiple RBs is the guard band.

In some examples, the guard band configuration component 1145 may be configured as or otherwise support a means for adding (e.g., via one or more processors, a memory, etc.) a set of multiple RBs between the first RB set and the second RB set, where the set of multiple RBs is unavailable for communications when the first slot format and the second slot format indicate full-duplex operation, and where the set of multiple RBs is the guard band.

In some examples, the guard band configuration component 1145 may be configured as or otherwise support a means for reserving (e.g., via one or more processors, a memory, etc.), based on a defined rule, a set of multiple RBs from the second RB set when the first slot format and the second slot format indicate full-duplex operation, where the set of multiple RBs interfaces with the first RB set, and where the set of multiple RBs is the guard band.

In some examples, each slot format from the at least one slot format is associated with a respective RB set from the at least one RB set. In some examples, one or more RB sets not in the at least one RB set are equivalent to one or more guard bands for the at least one RB set.

In some examples, the slot format component 1130 may be configured as or otherwise support a means for obtaining (e.g., receiving, identifying, ascertaining, selecting) a third message that indicates a baseline slot format for a bandwidth that includes the set of multiple RB sets, where the set of multiple RB sets, including the at least one RB set indicated by the second message, is associated with the baseline slot format. In some examples, the slot format component 1130 may be configured as or otherwise support a means for updating (e.g., via one or more processors, a memory, etc.) the at least one RB set from the baseline slot format to the at least one slot format indicated for the at least one RB set by the second message, the update being responsive to obtaining the second message. In some examples, the full-duplex component 1135 may be configured as or otherwise support a means for communicating, in accordance with the baseline slot format, via a portion of the bandwidth that excludes the at least one RB set.

In some examples, the slot format indicated for the RB set by the second message is to overwrite the baseline slot format for the bandwidth in accordance with a defined rule.

In some examples, the slot format component 1130 may be configured as or otherwise support a means for obtaining (e.g., receiving, identifying, ascertaining, selecting) a fourth message that indicates whether the at least one slot format indicated for the at least one RB set by the second message is to overwrite the baseline slot format for the bandwidth, where the update from the baseline slot format to the at least one slot format indicated for the at least one RB set by the second message is in accordance with the fourth message indicating that the at least one slot format indicated for the at least one RB set by the second message is to overwrite the baseline slot format for the bandwidth.

In some examples, the first message indicates, for each respective RB set from the set of multiple RB sets, a respective indication of a respective quantity of RBs in the respective RB set. In some examples, the RB set includes a first quantity of RBs in accordance with a first indication for the RB set and a second RB set includes a second quantity of RBs in accordance with a second indication for the second RB set.

In some examples, each index from the set of multiple indexes indicates a frequency domain location of a corresponding RB set from the set of multiple RB sets. In some examples, each index includes a starting RB index or an ending RB index.

In some examples, the communication is in accordance with a full-duplex communication operation. In some examples, the full-duplex communications operation is associated with the at least one slot format and one or more slot formats indicated for other RB sets of the set of multiple RB sets.

In some examples, each RB set from the set of multiple RB sets is associated with a downlink subband or an uplink subband. In some examples, the full-duplex communication operation includes subband full-duplex operation at the UE.

Additionally, or alternatively, the communications manager 1120 may support wireless communication at a wireless node in accordance with examples as disclosed herein. In some examples, the RB set configuration component 1125 may be configured as or otherwise support a means for receiving a first message that indicates a set of multiple RB sets and that indicates a set of multiple indexes corresponding to the set of multiple RB sets. In some examples, the slot format component 1130 may be configured as or otherwise support a means for receiving a second message that includes at least one index corresponding to at least one RB set from the set of multiple RB sets and that indicates at least one slot format for the at least one RB set, where a respective slot format of the at least one slot format corresponds to a respective RB set of the at least one RB sett. In some examples, the full-duplex component 1135 may be configured as or otherwise support a means for communicating using the at least one RB set in accordance with the at least one slot format.

In some examples, to support receiving the first message and the second message, the transceiver component 1140 may be configured as or otherwise support a means for receiving the first message and the second message from a CU via an F1 interface, where the first message and the second message indicate a subband configuration per cell to the wireless node, and where the wireless node is a DU.

In some examples, to support receiving the first message and the second message, the transceiver component 1140 may be configured as or otherwise support a means for receiving the first message and the second message from a network entity via RRC signaling as a semi-static indication of a subband configuration, and where the wireless node is a UE.

In some examples, to support receiving the first message and the second message, the transceiver component 1140 may be configured as or otherwise support a means for receiving the first message and the second message from a network entity via one or more MAC-CEs or DCI as a dynamic indication of a subband configuration, and where the wireless node is a UE.

In some examples, to support receiving the first message and the second message, the transceiver component 1140 may be configured as or otherwise support a means for receiving the first message and the second message from a network entity via one or more SIBs as a broadcast of a subband configuration, and where the wireless node is a UE.

Figure 12:
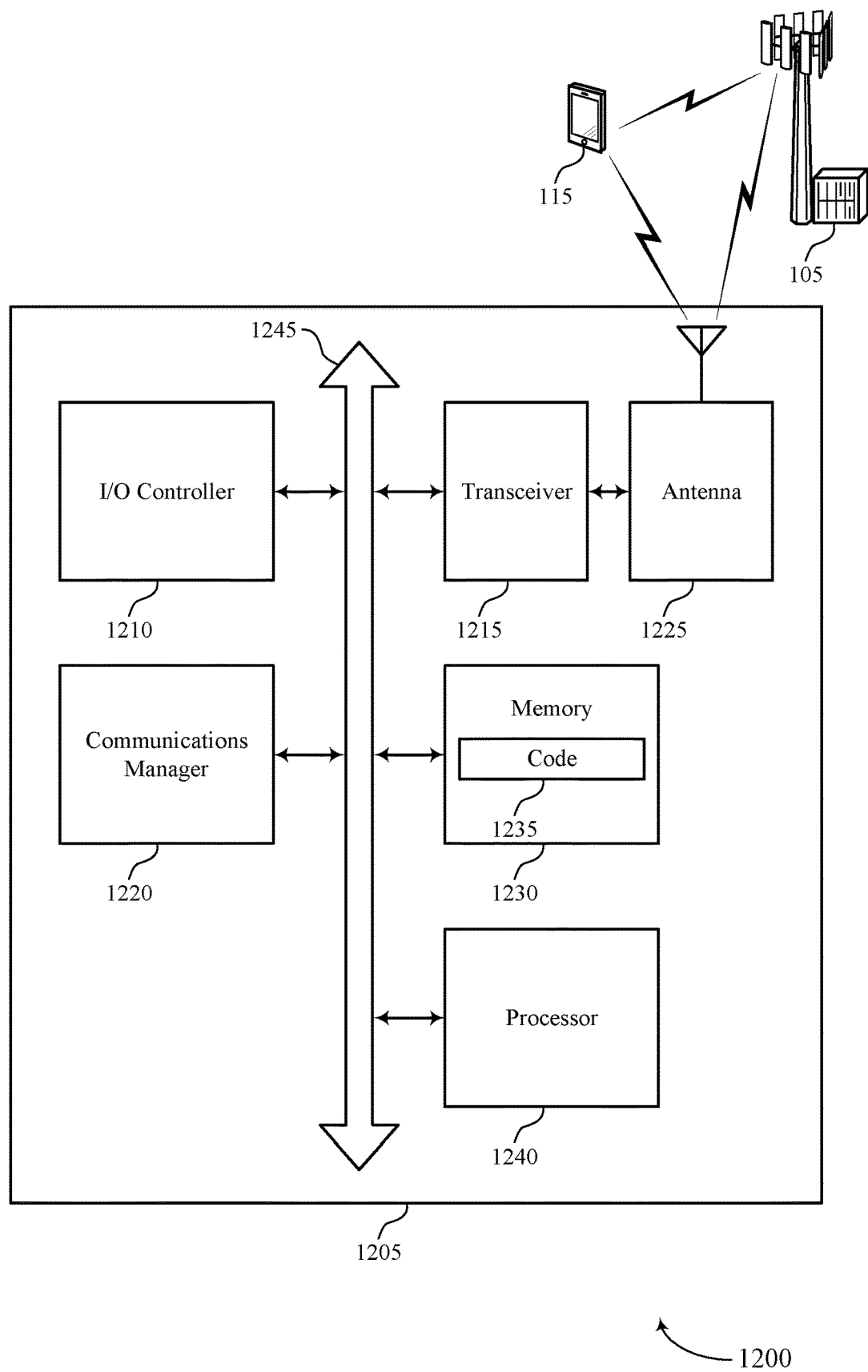
FIG. 12 shows a diagram of a system including a device that supports techniques for slot format configuration per RB set for subband full-duplex operation in accordance with one or more aspects of the present disclosure.

FIG. 12 shows a diagram of a system 1200 including a device 1205 that supports techniques for slot format configuration per RB set for subband full-duplex operation in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for slot format configuration per RB set for subband full-duplex operation). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for obtaining (e.g., receiving, identifying, ascertaining, selecting) a first message that indicates a set of multiple RB sets and that indicates a set of multiple indexes corresponding to the set of multiple RB sets. The communications manager 1220 may be configured as or otherwise support a means for obtaining (e.g., receiving, identifying, ascertaining, selecting) a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set. The communications manager 1220 may be configured as or otherwise support a means for communicating using the at least one RB set in accordance with the at least one slot format.

Additionally, or alternatively, the communications manager 1220 may support wireless communication at a wireless node in accordance with examples as disclosed herein. For example, the communications manager 1220 may be configured as or otherwise support a means for receiving a first message that indicates a set of multiple RB sets and that indicates a set of multiple indexes corresponding to the set of multiple RB sets. The communications manager 1220 may be configured as or otherwise support a means for receiving a second message that includes at least one index corresponding to at least one RB set from the set of multiple RB sets and that indicates at least one slot format for the at least one RB set, where a respective slot format of the at least one slot format corresponds to a respective RB set of the at least one RB sett. The communications manager 1220 may be configured as or otherwise support a means for communicating using the at least one RB set in accordance with the at least one slot format.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for slot format configuration per RB set for subband full-duplex operation as described herein, or the processor 1240 and the memory 1230 may be otherwise configured to perform or support such operations.

Figure 13:
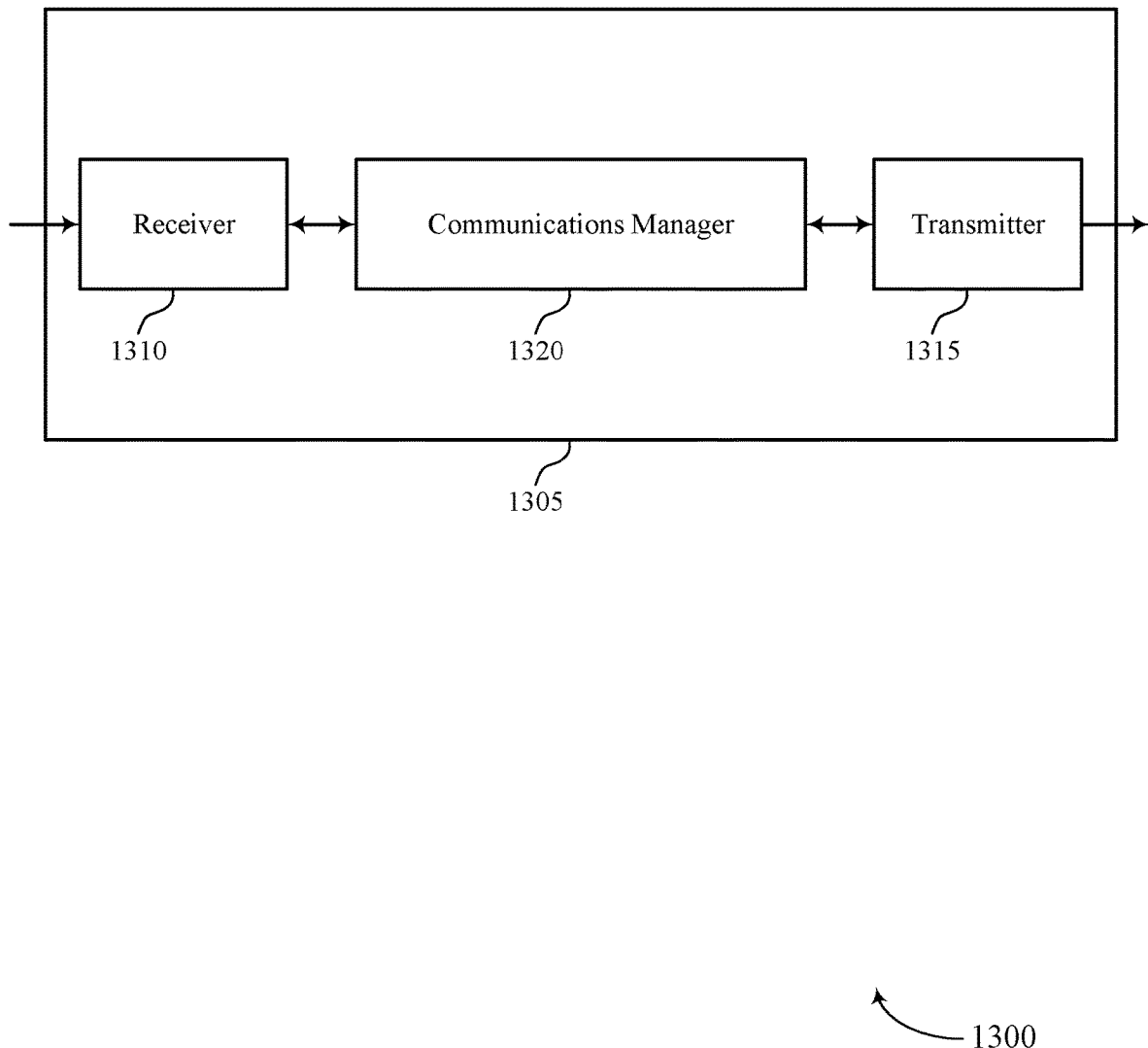
FIGS. 13 and 14 show block diagrams of devices that support techniques for slot format configuration per RB set for subband full-duplex operation in accordance with one or more aspects of the present disclosure.

FIG. 13 shows a block diagram 1300 of a device 1305 that supports techniques for slot format configuration per RB set for subband full-duplex operation in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of techniques for slot format configuration per RB set for subband full-duplex operation as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a wireless node in accordance with examples as disclosed herein. For example, the communications manager 1320 may be configured as or otherwise support a means for receiving a first message that indicates a set of multiple RB sets and that indicates a set of multiple indexes corresponding to the set of multiple RB sets. The communications manager 1320 may be configured as or otherwise support a means for receiving a second message that includes at least one index corresponding to at least one RB set from the set of multiple RB sets and that indicates at least one slot format for the at least one RB set, where a respective slot format of the at least one slot format corresponds to a respective RB set of the at least one RB sett. The communications manager 1320 may be configured as or otherwise support a means for communicating using the at least one RB set in accordance with the at least one slot format.

Additionally, or alternatively, the communications manager 1320 may support wireless communication at a network entity in accordance with examples as disclosed herein. For example, the communications manager 1320 may be configured as or otherwise support a means for outputting (e.g., transmitting, outputting for transmission) a first message that indicates a set of multiple RB sets and that indicates a set of multiple indexes corresponding to the set of multiple RB sets. The communications manager 1320 may be configured as or otherwise support a means for outputting a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set. The communications manager 1320 may be configured as or otherwise support a means for communicating using the at least one RB set in accordance with the at least one slot format.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reduced processing, reduced power consumption, and more efficient utilization of communication resources.

Means for receiving or means for obtaining may include a receiver (such as the receiver 1310 or a receive processor) or an antenna(s) of a network entity 105 or a receiver (such as the receiver 1310 or a receive processor) or an antenna(s) of a UE 115, or of other devices illustrated and described herein. Means for transmitting or means for outputting may include a transmitter (such as the transmitter 1315 or a transmit processor) or an antenna(s) of a network entity 105 or a transmitter (such as the transmitter 1315 or a transmit processor) or an antenna(s) of a UE 115, or of other devices illustrated and described herein. Means for detecting, means for forwarding, means for determining, and/or means for performing may include a processing system, which may include one or more processors, such as the communications manager 1320 or a processor 1635, a transmit MIMO processor, or a controller of a network entity 105 or a UE 115, or of other devices illustrated and described herein.

In some cases, rather than actually transmitting a frame or packet, a device may have an interface to output a frame for transmission (a means for outputting). For example, a processor may output a frame, via a bus interface, to an RF front end for transmission. Similarly, rather than actually receiving a frame, a device may have an interface to obtain a frame received from another device (a means for obtaining). For example, a processor may obtain (or receive) a frame, via a bus interface, from an RF front end for reception.

Figure 14:
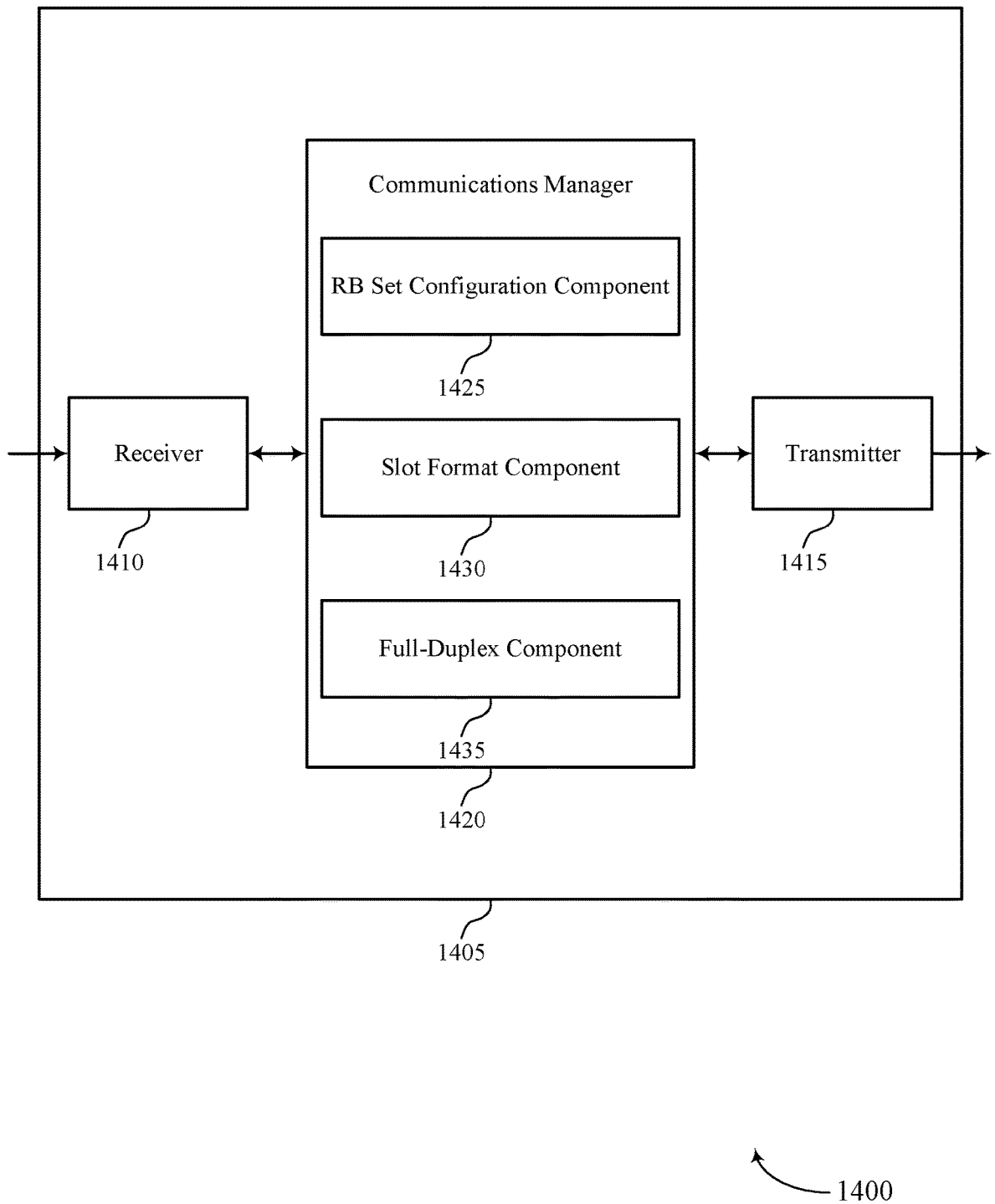

FIG. 14 shows a block diagram 1400 of a device 1405 that supports techniques for slot format configuration per RB set for subband full-duplex operation in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of techniques for slot format configuration per RB set for subband full-duplex operation as described herein. For example, the communications manager 1420 may include an RB set configuration component 1425, a slot format component 1430, a full-duplex component 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a wireless node in accordance with examples as disclosed herein. The RB set configuration component 1425 may be configured as or otherwise support a means for receiving a first message that indicates a set of multiple RB sets and that indicates a set of multiple indexes corresponding to the set of multiple RB sets. The slot format component 1430 may be configured as or otherwise support a means for receiving a second message that includes at least one index corresponding to at least one RB set from the set of multiple RB sets and that indicates at least one slot format for the at least one RB set, where a respective slot format of the at least one slot format corresponds to a respective RB set of the at least one RB sett. The full-duplex component 1435 may be configured as or otherwise support a means for communicating using the at least one RB set in accordance with the at least one slot format.

Additionally, or alternatively, the communications manager 1420 may support wireless communication at a network entity in accordance with examples as disclosed herein. The RB set configuration component 1425 may be configured as or otherwise support a means for outputting (e.g., transmitting, outputting for transmission) a first message that indicates a set of multiple RB sets and that indicates a set of multiple indexes corresponding to the set of multiple RB sets. The slot format component 1430 may be configured as or otherwise support a means for outputting (e.g., transmitting, outputting for transmission) a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set. The full-duplex component 1435 may be configured as or otherwise support a means for communicating using the at least one RB set in accordance with the at least one slot format.

Figure 15:
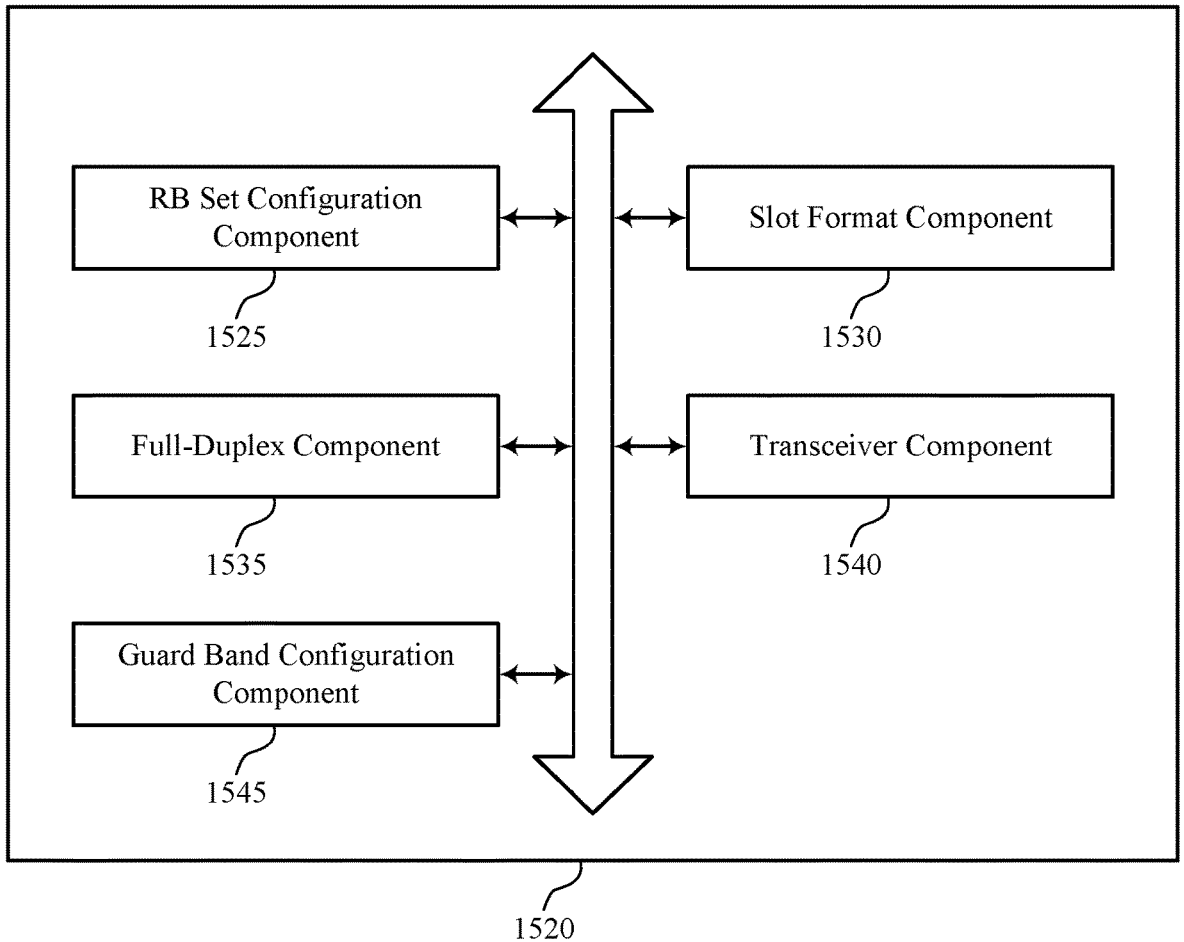
FIG. 15 shows a block diagram of a communications manager that supports techniques for slot format configuration per RB set for subband full-duplex operation in accordance with one or more aspects of the present disclosure.

FIG. 15 shows a block diagram 1500 of a communications manager 1520 that supports techniques for slot format configuration per RB set for subband full-duplex operation in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of techniques for slot format configuration per RB set for subband full-duplex operation as described herein. For example, the communications manager 1520 may include an RB set configuration component 1525, a slot format component 1530, a full-duplex component 1535, a transceiver component 1540, a guard band configuration component 1545, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Further, a component as described herein may be examples of means-plus-function components and may include one or more processors, processing systems, hardware and/or software components, controller, microcontroller, state machine, a DSP and a microprocessor, a plurality of microprocessors, one or more microprocessors in conjunction with a DSP core, programmable logic devices (PLDs), any other suitable circuitry, or any combination of circuits that may performed the various functionalities described throughout this disclosure.

The communications manager 1520 may support wireless communication at a wireless node in accordance with examples as disclosed herein. The RB set configuration component 1525 may be configured as or otherwise support a means for receiving a first message that indicates a set of multiple RB sets and that indicates a set of multiple indexes corresponding to the set of multiple RB sets. The slot format component 1530 may be configured as or otherwise support a means for receiving a second message that includes at least one index corresponding to at least one RB set from the set of multiple RB sets and that indicates at least one slot format for the at least one RB set, where a respective slot format of the at least one slot format corresponds to a respective RB set of the at least one RB sett. The full-duplex component 1535 may be configured as or otherwise support a means for communicating using the at least one RB set in accordance with the at least one slot format.

In some examples, to support receiving the first message and the second message, the transceiver component 1540 may be configured as or otherwise support a means for receiving the first message and the second message from a CU via an F1 interface, where the first message and the second message indicate a subband configuration per cell to the wireless node, and where the wireless node is a DU.

In some examples, to support receiving the first message and the second message, the transceiver component 1540 may be configured as or otherwise support a means for receiving the first message and the second message from a network entity via RRC signaling as a semi-static indication of a subband configuration, and where the wireless node is a UE.

In some examples, to support receiving the first message and the second message, the transceiver component 1540 may be configured as or otherwise support a means for receiving the first message and the second message from a network entity via one or more MAC-CEs or DCI as a dynamic indication of a subband configuration, and where the wireless node is a UE.

In some examples, to support receiving the first message and the second message, the transceiver component 1540 may be configured as or otherwise support a means for receiving the first message and the second message from a network entity via one or more SIBs as a broadcast of a subband configuration, and where the wireless node is a UE.

Additionally, or alternatively, the communications manager 1520 may support wireless communication at a network entity in accordance with examples as disclosed herein. In some examples, the RB set configuration component 1525 may be configured as or otherwise support a means for outputting (e.g., transmitting, outputting for transmission) a first message that indicates a set of multiple RB sets and that indicates a set of multiple indexes corresponding to the set of multiple RB sets. In some examples, the slot format component 1530 may be configured as or otherwise support a means for outputting (e.g., transmitting, outputting for transmission) a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set. In some examples, the full-duplex component 1535 may be configured as or otherwise support a means for communicating using the at least one RB set in accordance with the at least one slot format.

In some examples, the at least one slot format includes a set of multiple slot formats, the at least one RB set includes the set of multiple RB sets, each slot format from the set of multiple slot formats is associated with a respective RB set from the set of multiple RB sets, and the set of multiple slot formats includes a first slot format for a first RB set and a second slot format for a second RB set, the first RB set and the second RB set being from the set of multiple RB sets.

In some examples, the second message indicates a first sequence of communication directions for time domain resources associated with the first slot format and a second sequence of communication directions for time domain resources associated with the second slot format. In some examples, the first sequence of communication directions is different from the second sequence of communication directions. In some examples, the network entity communicates in accordance with a full-duplex communication mode based on the first sequence of communication directions and the second sequence of communication directions.

In some examples, the first message or the second message, or both, further indicate a resource allocation for a guard band between the first RB set and the second RB set. In some examples, the first message and the second message are a same message or are different messages.

In some examples, the set of multiple slot formats includes a third slot format for a third RB set from the set of multiple RB sets. In some examples, the third slot format indicates that a portion of the third RB set is unavailable for communications when the first slot format and the second slot format indicate full-duplex operation. In some examples, the third RB set is the guard band.

In some examples, the third RB set is located between the first RB set and the second RB set.

In some examples, the guard band configuration component 1545 may be configured as or otherwise support a means for outputting (e.g., transmitting, outputting for transmission) an indication of a set of multiple RBs between the first RB set and the second RB set, where the set of multiple RBs is unavailable for communications when the first slot format and the second slot format indicate full-duplex operation, and where the set of multiple RBs is the guard band.

In some examples, the guard band configuration component 1545 may be configured as or otherwise support a means for adding (e.g., via one or more processors, a memory, etc.) a set of multiple RBs between the first RB set and the second RB set, where the set of multiple RBs is unavailable for communications when the first slot format and the second slot format indicate full-duplex operation, and where the set of multiple RBs is the guard band.

In some examples, the guard band configuration component 1545 may be configured as or otherwise support a means for reserving (e.g., via one or more processors, a memory, etc.), based on a defined rule, a set of multiple RBs from the second RB set when the first slot format and the second slot format indicate full-duplex operation, where the set of multiple RBs interfaces with the first RB set, and where the set of multiple RBs is the guard band.

In some examples, each slot format from the at least one slot format is associated with a respective RB set from the at least one RB set. In some examples, one or more RB sets not in the at least one RB set are equivalent to one or more guard bands for the at least one RB set.

In some examples, the slot format component 1530 may be configured as or otherwise support a means for outputting (e.g., transmitting, outputting for transmission) a third message that indicates a baseline slot format for a bandwidth that includes the set of multiple RB sets, where the set of multiple RB sets, including the at least one RB set indicated by the second message, is associated with the baseline slot format. In some examples, the slot format component 1530 may be configured as or otherwise support a means for updating (e.g., via one or more processors, a memory, etc.)

the at least one RB set from the baseline slot format to the at least one slot format indicated for the at least one RB set by the second message, the update being responsive to obtaining the second message. In some examples, the full-duplex component 1535 may be configured as or otherwise support a means for communicating, in accordance with the baseline slot format, via a portion of the bandwidth that excludes the at least one RB set.

In some examples, the slot format indicated for the RB set by the second message is to overwrite the baseline slot format for the bandwidth in accordance with a defined rule.

In some examples, the slot format component 1530 may be configured as or otherwise support a means for outputting (e.g., transmitting, outputting for transmission) a fourth message that indicates whether the at least one slot format indicated for the at least one RB set by the second message is to overwrite the baseline slot format for the bandwidth, where the update from the baseline slot format to the at least one slot format indicated for the at least one RB set by the second message is in accordance with the fourth message indicating that the at least one slot format indicated for the at least one RB set by the second message is to overwrite the baseline slot format for the bandwidth.

In some examples, the first message indicates, for each respective RB set from the set of multiple RB sets, a respective indication of a respective quantity of RBs in the respective RB set. In some examples, the RB set includes a first quantity of RBs in accordance with a first indication for the RB set and a second RB set includes a second quantity of RBs in accordance with a second indication for the second RB set.

In some examples, each index from the set of multiple indexes indicates a frequency domain location of a corresponding RB set from the set of multiple RB sets. In some examples, each index includes a starting RB index or an ending RB index.

In some examples, the communication is in accordance with a full-duplex communication operation. In some examples, the full-duplex communications operation is associated with the at least one slot format and one or more slot formats indicated for other RB sets of the set of multiple RB sets.

In some examples, each RB set from the set of multiple RB sets is associated with a downlink subband or an uplink subband. In some examples, the full-duplex communication mode includes subband full-duplex operation at the network entity.

Figure 16:
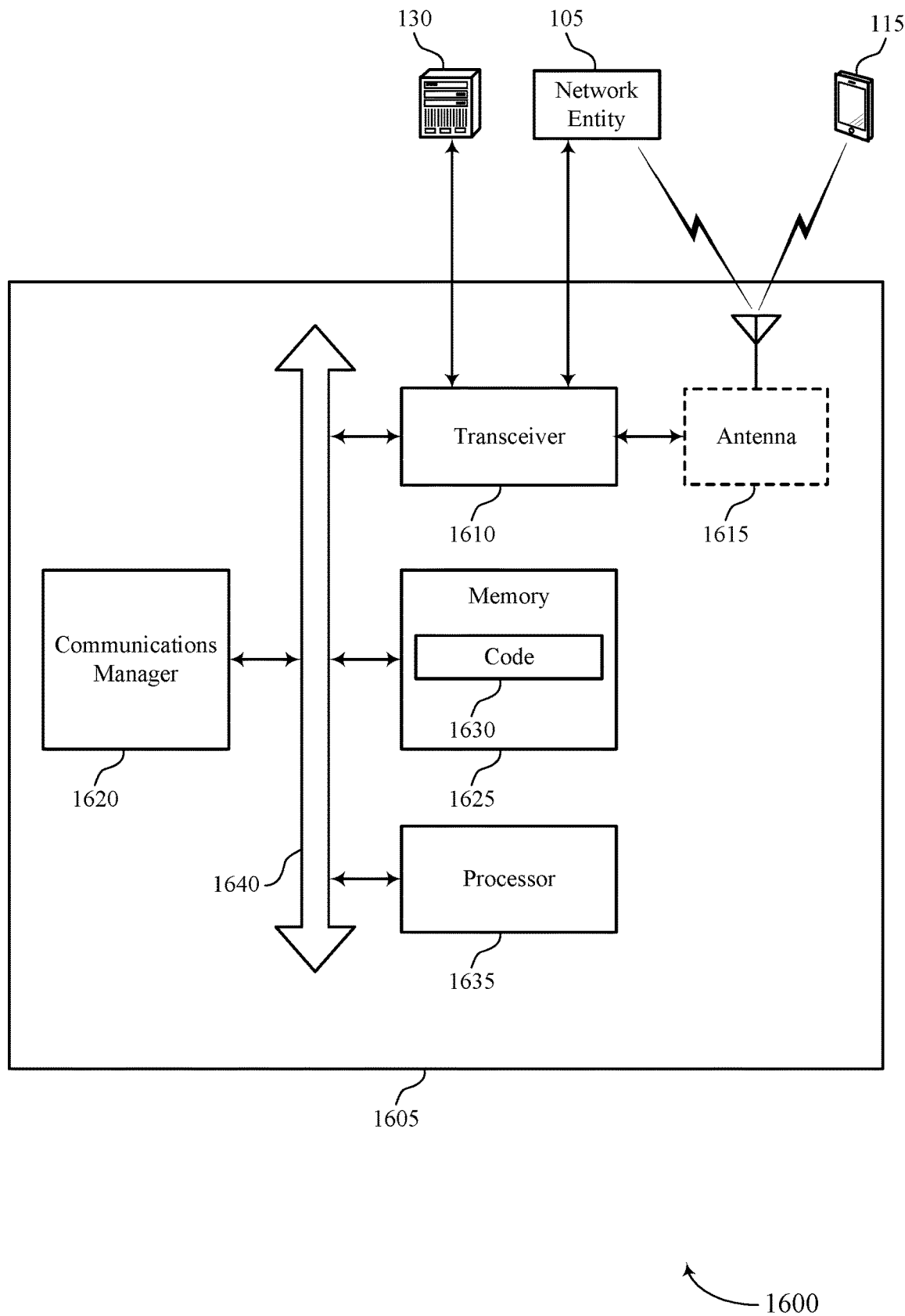
FIG. 16 shows a diagram of a system including a device that supports techniques for slot format configuration per RB set for subband full-duplex operation in accordance with one or more aspects of the present disclosure.

FIG. 16 shows a diagram of a system 1600 including a device 1605 that supports techniques for slot format configuration per RB set for subband full-duplex operation in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or memory components (for example, the processor 1635, or the memory 1625, or both), may be included in a chip or chip assembly that is installed in the device 1605. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting techniques for slot format configuration per RB set for subband full-duplex operation). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605. The processor 1635 may be any one or more suitable processors capable of executing scripts or instructions of one or more software programs stored in the device 1605 (such as within the memory 1625).

In some implementations, the processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1605 may transmit information output from the chip or modem. Additionally, or alternatively, in some implementations, the one or more interfaces may refer to an interface between the processing system of the chip or modem and a receiver, such that the device 1605 may obtain information or signal inputs, and the information may be passed to the processing system. A person having ordinary skill in the art will readily recognize that a first interface also may obtain information or signal inputs, and a second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at a wireless node in accordance with examples as disclosed herein. For example, the communications manager 1620 may be configured as or otherwise support a means for receiving a first message that indicates a set of multiple RB sets and that indicates a set of multiple indexes corresponding to the set of multiple RB sets. The communications manager 1620 may be configured as or otherwise support a means for receiving a second message that includes at least one index corresponding to at least one RB set from the set of multiple RB sets and that indicates at least one slot format for the at least one RB set, where a respective slot format of the at least one slot format corresponds to a respective RB set of the at least one RB sett. The communications manager 1620 may be configured as or otherwise support a means for communicating using the at least one RB set in accordance with the at least one slot format.

Additionally, or alternatively, the communications manager 1620 may support wireless communication at a network entity in accordance with examples as disclosed herein. For example, the communications manager 1620 may be configured as or otherwise support a means for outputting (e.g., transmitting, outputting for transmission) a first message that indicates a set of multiple RB sets and that indicates a set of multiple indexes corresponding to the set of multiple RB sets. The communications manager 1620 may be configured as or otherwise support a means for outputting (e.g., transmitting, outputting for transmission) a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set. The communications manager 1620 may be configured as or otherwise support a means for communicating using the at least one RB set in accordance with the at least one slot format.

By including or configuring the communications manager 1620 in accordance with examples as described herein, the device 1605 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, the processor 1635, the memory 1625, the code 1630, or any combination thereof. For example, the code 1630 may include instructions executable by the processor 1635 to cause the device 1605 to perform various aspects of techniques for slot format configuration per RB set for subband full-duplex operation as described herein, or the processor 1635 and the memory 1625 may be otherwise configured to perform or support such operations.

Figure 17:
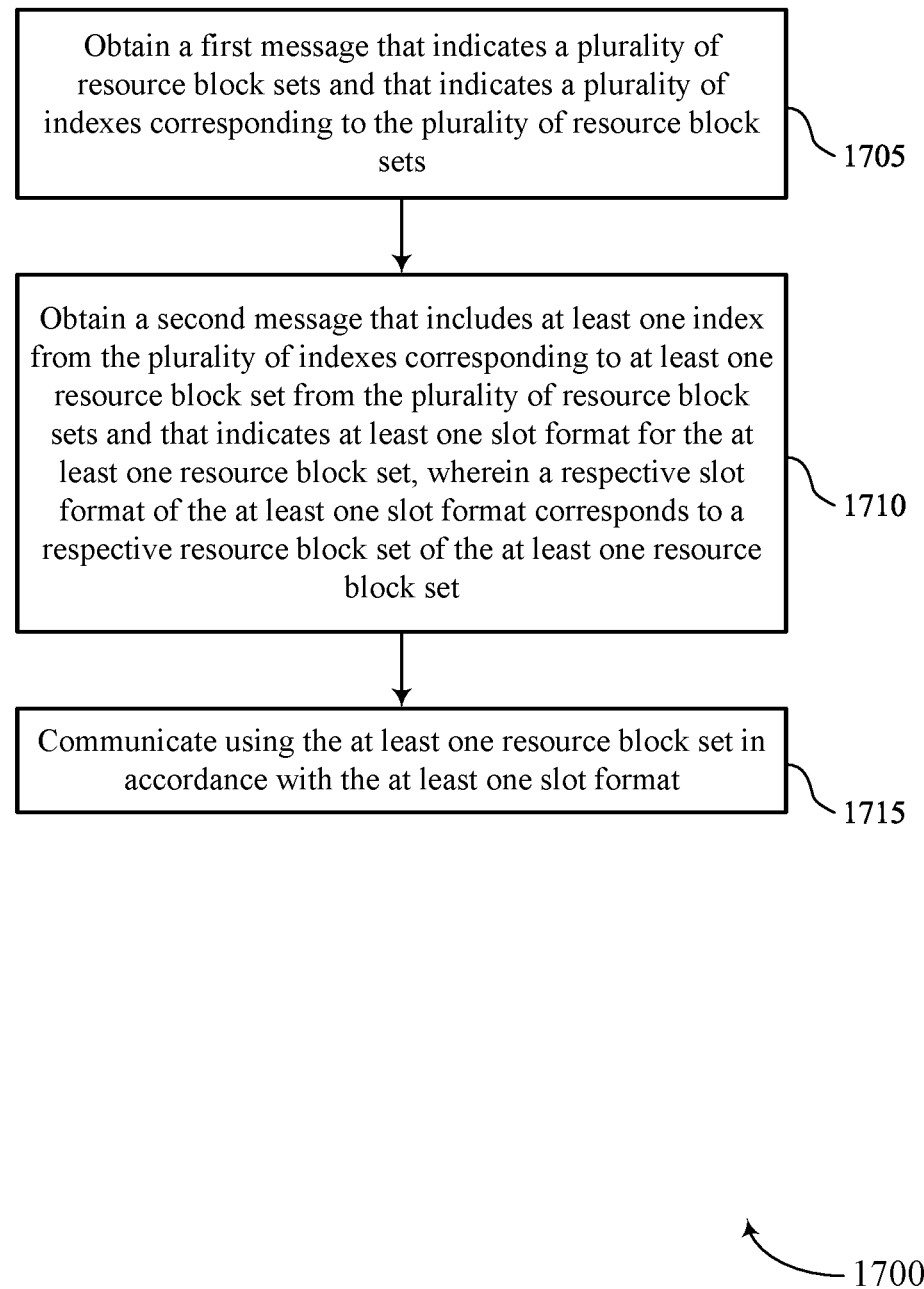
FIGS. 17 and 18 show flowcharts illustrating methods that support techniques for slot format configuration per RB set for subband full-duplex operation in accordance with one or more aspects of the present disclosure.

FIG. 17 shows a flowchart illustrating a method 1700 that supports techniques for slot format configuration per RB set for subband full-duplex operation in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include obtaining a first message that indicates a set of multiple RB sets and that indicates a set of multiple indexes corresponding to the set of multiple RB sets. The operations of 1705 may be performed in accordance with examples as disclosed herein. In some examples, aspects of the operations of 1705 may be performed by an RB set configuration component 1125 as described with reference to FIG. 11.

At 1710, the method may include obtaining a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set. The operations of 1710 may be performed in accordance with examples as disclosed herein. In some examples, aspects of the operations of 1710 may be performed by a slot format component 1130 as described with reference to FIG. 11.

At 1715, the method may include communicating using the at least one RB set in accordance with the at least one slot format. The operations of 1715 may be performed in accordance with examples as disclosed herein. In some examples, aspects of the operations of 1715 may be performed by a full-duplex component 1135 as described with reference to FIG. 11.

Figure 18:
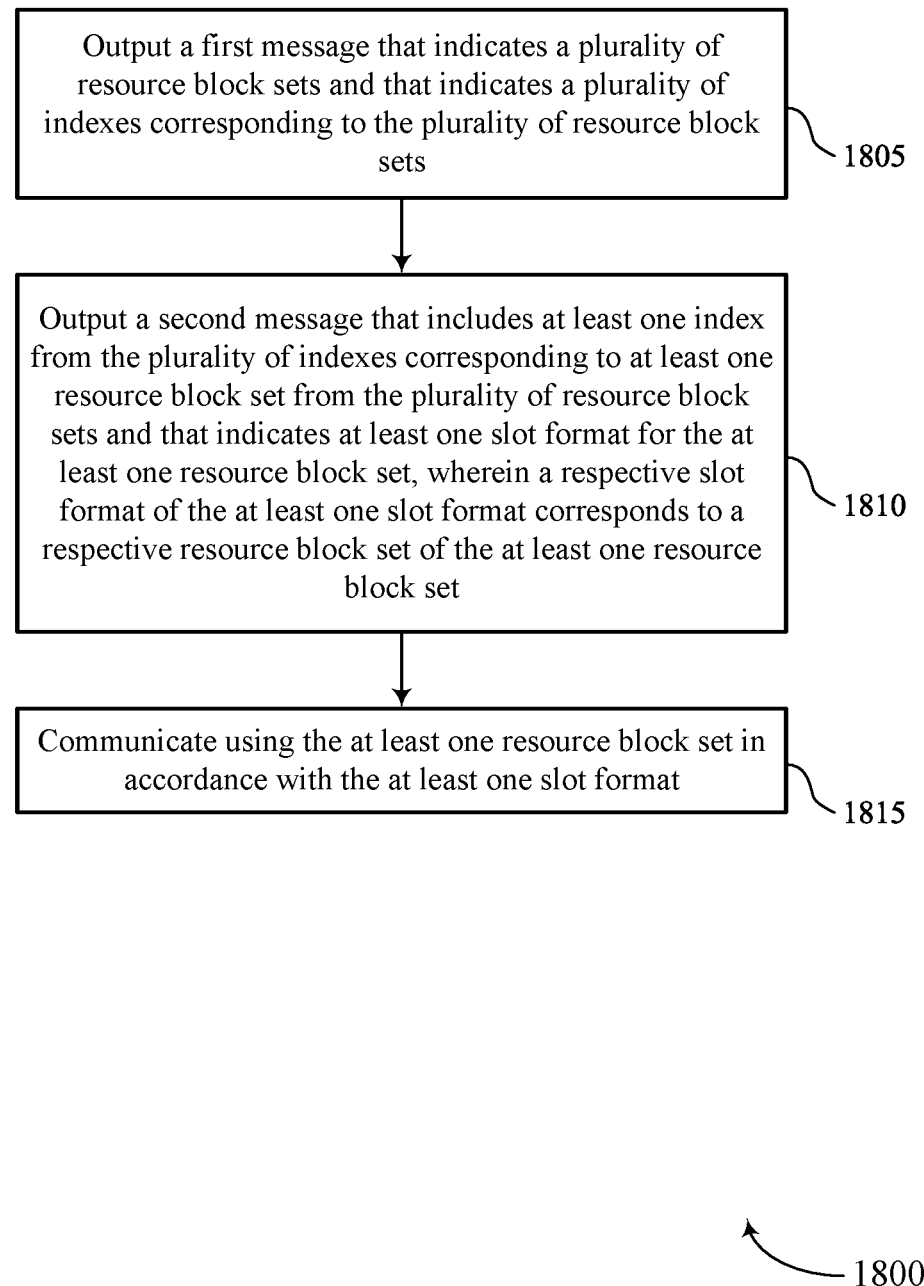

FIG. 18 shows a flowchart illustrating a method 1800 that supports techniques for slot format configuration per RB set for subband full-duplex operation in accordance with one or more aspects of the present disclosure. The operations of the method 1800 may be implemented by a network entity or its components as described herein. For example, the operations of the method 1800 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1805, the method may include outputting a first message that indicates a set of multiple RB sets and that indicates a set of multiple indexes corresponding to the set of multiple RB sets. The operations of 1805 may be performed in accordance with examples as disclosed herein. In some examples, aspects of the operations of 1805 may be performed by an RB set configuration component 1525 as described with reference to FIG. 15.

At 1810, the method may include outputting a second message that includes at least one index from the set of multiple indexes corresponding to at least one RB set from the set of multiple RB sets and that indicates at least one slot format for the at least one RB set, where a respective slot format of the at least one slot format corresponds to a respective RB set of the at least one RB set. The operations of 1810 may be performed in accordance with examples as disclosed herein. In some examples, aspects of the operations of 1810 may be performed by a slot format component 1530 as described with reference to FIG. 15.

At 1815, the method may include communicating using the at least one RB set in accordance with the at least one slot format. The operations of 1815 may be performed in accordance with examples as disclosed herein. In some examples, aspects of the operations of 1815 may be performed by a full-duplex component 1535 as described with reference to FIG. 15.

The following provides an overview of aspects of the present disclosure:

Aspect 1: A method for wireless communication at a UE, comprising: obtaining a first message that indicates a plurality of RB sets and that indicates a plurality of indexes corresponding to the plurality of RB sets; obtaining a second message that includes at least one index from the plurality of indexes corresponding to at least one RB set from the plurality of RB sets and that indicates at least one slot format for the at least one RB set, wherein a respective slot format of the at least one slot format corresponds to a respective RB set of the at least one RB set; and communicating using the at least one RB set in accordance with the at least one slot format.

Aspect 2: The method of aspect 1, wherein the at least one slot format comprises a plurality of slot formats, the at least one RB set comprises the plurality of RB sets, each slot format from the plurality of slot formats is associated with a respective RB set from the plurality of RB sets, and the plurality of slot formats includes a first slot format for a first RB set and a second slot format for a second RB set, the first RB set and the second RB set being from the plurality of RB sets.

Aspect 3: The method of aspect 2, wherein the second message indicates a first sequence of communication directions for time domain resources associated with the first slot format and a second sequence of communication directions for time domain resources associated with the second slot format, the first sequence of communication directions is different from the second sequence of communication directions, and the UE communicates in accordance with a full-duplex communication mode based at least in part on the first sequence of communication directions and the second sequence of communication directions.

Aspect 4: The method of any of aspects 2 through 3, wherein the first message or the second message, or both, further indicate a resource allocation for a guard band between the first RB set and the second RB set, and the first message and the second message are a same message or are different messages.

Aspect 5: The method of aspect 4, wherein the plurality of slot formats includes a third slot format for a third RB set from the plurality of RB sets, the third slot format indicates that a portion of the third RB set is unavailable for communications when the first slot format and the second slot format indicate full-duplex operation, and the third RB set is the guard band.

Aspect 6: The method of aspect 5, wherein the third RB set is located between the first RB set and the second RB set.

Aspect 7: The method of aspect 4, further comprising: obtaining an indication of a plurality of RBs between the first RB set and the second RB set, wherein the plurality of RBs is unavailable for communications when the first slot format and the second slot format indicate full-duplex operation, and wherein the plurality of RBs is the guard band.

Aspect 8: The method of any of aspects 4 or 7, further comprising: adding a plurality of RBs between the first RB set and the second RB set, wherein the plurality of RBs is unavailable for communications when the first slot format and the second slot format indicate full-duplex operation, and wherein the plurality of RBs is the guard band.

Aspect 9: The method of any of aspects 4 or 7, further comprising: reserving, based on a defined rule, a plurality of RBs from the second RB set when the first slot format and the second slot format indicate full-duplex operation, wherein the plurality of RBs interfaces with the first RB set, and wherein the plurality of RBs is the guard band.

Aspect 10: The method of any of aspects 1 through 4, wherein each slot format from the at least one slot format is associated with a respective RB set from the at least one RB set, and one or more RB sets not in the at least one RB set are equivalent to one or more guard bands for the at least one RB set.

Aspect 11: The method of any of aspects 1 through 10, further comprising: obtaining a third message that indicates a baseline slot format for a bandwidth that includes the plurality of RB sets, wherein the plurality of RB sets, including the at least one RB set indicated by the second message, is associated with the baseline slot format; updating the at least one RB set from the baseline slot format to the at least one slot format indicated for the at least one RB set by the second message, the update being responsive to obtaining the second message; and communicating, in accordance with the baseline slot format, via a portion of the bandwidth that excludes the at least one RB set.

Aspect 12: The method of aspect 11, wherein the slot format indicated for the RB set by the second message is to overwrite the baseline slot format for the bandwidth in accordance with a defined rule.

Aspect 13: The method of aspect 11, further comprising: obtaining a fourth message that indicates whether the at least one slot format indicated for the at least one RB set by the second message is to overwrite the baseline slot format for the bandwidth, wherein the update from the baseline slot format to the at least one slot format indicated for the at least one RB set by the second message is in accordance with the fourth message indicating that the at least one slot format indicated for the at least one RB set by the second message is to overwrite the baseline slot format for the bandwidth.

Aspect 14: The method of any of aspects 1 through 13, wherein the first message indicates, for each respective RB set from the plurality of RB sets, a respective indication of a respective quantity of RBs in the respective RB set, and the RB set includes a first quantity of RBs in accordance with a first indication for the RB set and a second RB set includes a second quantity of RBs in accordance with a second indication for the second RB set.

Aspect 15: The method of any of aspects 1 through 14, wherein each index from the plurality of indexes indicates a frequency domain location of a corresponding RB set from the plurality of RB sets, and each index comprises a starting RB index or an ending RB index.

Aspect 16: The method of any of aspects 1 through 15, wherein the communication is in accordance with a full-duplex communication operation, the full-duplex communications operation is associated with the at least one slot format and one or more slot formats indicated for other RB sets of the plurality of RB sets.

Aspect 17: The method of aspect 16, wherein each RB set from the plurality of RB sets is associated with a downlink subband or an uplink subband, and the full-duplex communication operation includes subband full-duplex operation at the UE.

Aspect 18: A method for wireless communication at a wireless node, comprising: receiving a first message that indicates a plurality of RB sets and that indicates a plurality of indexes corresponding to the plurality of RB sets; and receiving a second message that includes at least one index corresponding to at least one RB set from the plurality of RB sets and that indicates at least one slot format for the at least one RB set, wherein a respective slot format of the at least one slot format corresponds to a respective RB set of the at least one RB sett; and communicating using the at least one RB set in accordance with the at least one slot format.

Aspect 19: The method of aspect 18, wherein receiving the first message and the second message comprises: receiving the first message and the second message from a CU via an F1 interface, wherein the first message and the second message indicate a subband configuration per cell to the wireless node, and wherein the wireless node is a DU.

Aspect 20: The method of aspect 18, wherein receiving the first message and the second message comprises: receiving the first message and the second message from a network entity via RRC signaling as a semi-static indication of a subband configuration, and wherein the wireless node is a UE.

Aspect 21: The method of any of aspects 18 or 20, wherein receiving the first message and the second message comprises: receiving the first message and the second message from a network entity via one or more MAC-CEs or DCI as a dynamic indication of a subband configuration, and wherein the wireless node is a UE.

Aspect 22: The method of any of aspects 18, 20, or 21, wherein receiving the first message and the second message comprises: receiving the first message and the second message from a network entity via one or more SIBs as a broadcast of a subband configuration, and wherein the wireless node is a UE.

Aspect 23: A method for wireless communication at a network entity, comprising: outputting a first message that indicates a plurality of RB sets and that indicates a plurality of indexes corresponding to the plurality of RB sets; outputting a second message that includes at least one index from the plurality of indexes corresponding to at least one RB set from the plurality of RB sets and that indicates at least one slot format for the at least one RB set, wherein a respective slot format of the at least one slot format corresponds to a respective RB set of the at least one RB set; and communicating using the at least one RB set in accordance with the at least one slot format.

Aspect 24: The method of aspect 23, wherein the at least one slot format comprises a plurality of slot formats, the at least one RB set comprises the plurality of RB sets, each slot format from the plurality of slot formats is associated with a respective RB set from the plurality of RB sets, and the plurality of slot formats includes a first slot format for a first RB set and a second slot format for a second RB set, the first RB set and the second RB set being from the plurality of RB sets.

Aspect 25: The method of aspect 24, wherein the second message indicates a first sequence of communication directions for time domain resources associated with the first slot format and a second sequence of communication directions for time domain resources associated with the second slot format, the first sequence of communication directions is different from the second sequence of communication directions, and the network entity communicates in accordance with a full-duplex communication mode based at least in part on the first sequence of communication directions and the second sequence of communication directions.

Aspect 26: The method of any of aspects 24 through 25, wherein the first message or the second message, or both, further indicate a resource allocation for a guard band between the first RB set and the second RB set, and the first message and the second message are a same message or are different messages.

Aspect 27: The method of aspect 26, wherein the plurality of slot formats includes a third slot format for a third RB set from the plurality of RB sets, the third slot format indicates that a portion of the third RB set is unavailable for communications when the first slot format and the second slot format indicate full-duplex operation, and the third RB set is the guard band.

Aspect 28: The method of aspect 27, wherein the third RB set is located between the first RB set and the second RB set.

Aspect 29: The method of aspect 26, further comprising: outputting an indication of a plurality of RBs between the first RB set and the second RB set, wherein the plurality of RBs is unavailable for communications when the first slot format and the second slot format indicate full-duplex operation, and wherein the plurality of RBs is the guard band.

Aspect 30: The method of any of aspects 26 or 29, further comprising: adding a plurality of RBs between the first RB set and the second RB set, wherein the plurality of RBs is unavailable for communications when the first slot format and the second slot format indicate full-duplex operation, and wherein the plurality of RBs is the guard band.

Aspect 31: The method of any of aspects 26 or 29, further comprising: reserving, based on a defined rule, a plurality of RBs from the second RB set when the first slot format and the second slot format indicate full-duplex operation, wherein the plurality of RBs interfaces with the first RB set, and wherein the plurality of RBs is the guard band.

Aspect 32: The method of any of aspects 23 through 26, wherein each slot format from the at least one slot format is associated with a respective RB set from the at least one RB set, and one or more RB sets not in the at least one RB set are equivalent to one or more guard bands for the at least one RB set.

Aspect 33: The method of any of aspects 23 through 32, further comprising: outputting a third message that indicates a baseline slot format for a bandwidth that includes the plurality of RB sets, wherein the plurality of RB sets, including the at least one RB set indicated by the second message, is associated with the baseline slot format; updating the at least one RB set from the baseline slot format to the at least one slot format indicated for the at least one RB set by the second message, the update being responsive to obtaining the second message; and communicating, in accordance with the baseline slot format, via a portion of the bandwidth that excludes the at least one RB set.

Aspect 34: The method of aspect 33, wherein the slot format indicated for the RB set by the second message is to overwrite the baseline slot format for the bandwidth in accordance with a defined rule.

Aspect 35: The method of aspect 33, further comprising: outputting a fourth message that indicates whether the at least one slot format indicated for the at least one RB set by the second message is to overwrite the baseline slot format for the bandwidth, wherein the update from the baseline slot format to the at least one slot format indicated for the at least one RB set by the second message is in accordance with the fourth message indicating that the at least one slot format indicated for the at least one RB set by the second message is to overwrite the baseline slot format for the bandwidth.

Aspect 36: The method of any of aspects 23 through 35, wherein the first message indicates, for each respective RB set from the plurality of RB sets, a respective indication of a respective quantity of RBs in the respective RB set, and the RB set includes a first quantity of RBs in accordance with a first indication for the RB set and a second RB set includes a second quantity of RBs in accordance with a second indication for the second RB set.

Aspect 37: The method of any of aspects 23 through 36, wherein each index from the plurality of indexes indicates a frequency domain location of a corresponding RB set from the plurality of RB sets, and each index comprises a starting RB index or an ending RB index.

Aspect 38: The method of any of aspects 23 through 37, wherein the communication is in accordance with a full-duplex communication operation, the full-duplex communications operation is associated with the at least one slot format and one or more slot formats indicated for other RB sets of the plurality of RB sets.

Aspect 39: The method of aspect 38, wherein each RB set from the plurality of RB sets is associated with a downlink subband or an uplink subband, and the full-duplex communication mode includes subband full-duplex operation at the network entity.

Aspect 40: A UE or a DU, comprising: one or more transceivers and a processing system capable of performing a method of any of aspects 1 through 17 or 18 through 22, wherein the one or more transceivers are configured to: receive a first message that indicates a plurality of RB sets and that indicates a plurality of indexes corresponding to the plurality of RB sets; receive a second message that includes at least one index from the plurality of indexes corresponding to at least one RB set from the plurality of RB sets and that indicates at least one slot format for the at least one RB set, wherein a respective slot format of the at least one slot format corresponds to a respective RB set of the at least one RB set; and communicate using the at least one RB set in accordance with the at least one slot format.

Aspect 41: An apparatus for wireless communication, comprising at least one processor; memory comprising instructions executable by the at least one processor to cause the apparatus to perform a method of any of aspects 1 through 17.

Aspect 42: An apparatus for wireless communication, comprising at least one means for performing a method of any of aspects 1 through 17.

Aspect 43: A non-transitory computer-readable medium storing code for wireless communication, the code comprising instructions executable by at least one processor to perform a method of any of aspects 1 through 17.

Aspect 44: An apparatus for wireless communication, comprising at least one processor; memory comprising instructions executable by the at least one processor to cause the apparatus to perform a method of any of aspects 18 through 22.

Aspect 45: An apparatus for wireless communication, comprising at least one means for performing a method of any of aspects 18 through 22.

Aspect 46: A non-transitory computer-readable medium storing code for wireless communication, the code comprising instructions executable by at least one processor to perform a method of any of aspects 18 through 22.

Aspect 47: A network entity comprising one or more transceivers and a processing system capable of performing a method of any of aspects 23 through 39, wherein the one or more transceivers are configured to: transmit a first message that indicates a plurality of RB sets and that indicates a plurality of indexes corresponding to the plurality of RB sets; transmit a second message that includes at least one index from the plurality of indexes corresponding to at least one RB set from the plurality of RB sets and that indicates at least one slot format for the at least one RB set, wherein a respective slot format of the at least one slot format corresponds to a respective RB set of the at least one RB set; and communicate using the at least one RB set in accordance with the at least one slot format.

Aspect 48: An apparatus for wireless communication, comprising at least one processor; memory comprising instructions executable by the at least one processor to cause the apparatus to perform a method of any of aspects 23 through 39.

Aspect 49: An apparatus for wireless communication, comprising at least one means for performing a method of any of aspects 23 through 39.

Aspect 50: A non-transitory computer-readable medium storing code for wireless communication, the code comprising instructions executable by at least one processor to perform a method of any of aspects 23 through 39.

It should be noted that the methods described herein describe possible implementations, and that the operations and the steps may be rearranged or otherwise modified and that other implementations are possible. Further, aspects from two or more of the methods may be combined.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AA or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
at least one processor; and
memory comprising instructions executable by the at least one processor to cause the apparatus to:
obtain a first message that indicates a plurality of resource block sets and that indicates a plurality of indexes corresponding to the plurality of resource block sets;
obtain a second message that indicates a baseline slot format associated with a bandwidth that includes the plurality of resource block sets;
obtain a third message that includes at least one index from the plurality of indexes corresponding to at least one resource block set from the plurality of resource block sets and that indicates at least one slot format associated with the at least one resource block set, wherein a respective slot format of the at least one slot format corresponds to a respective resource block set of the at least one resource block set;
update the at least one resource block set from the baseline slot format to the at least one slot format indicated for the at least one resource block set by the third message;
communicate, in accordance with the baseline slot format, via a portion of the bandwidth that excludes the at least one resource block set; and
communicate using the at least one resource block set in accordance with the at least one slot format.

2. The apparatus of claim 1, wherein:
the at least one slot format comprises a plurality of slot formats;
the at least one resource block set comprises the plurality of resource block sets;
each slot format from the plurality of slot formats is associated with a respective resource block set from the plurality of resource block sets; and
the plurality of slot formats includes a first slot format for a first resource block set and a second slot format for a second resource block set, the first resource block set and the second resource block set being from the plurality of resource block sets.

3. The apparatus of claim 2, wherein the third message indicates a first sequence of communication directions for time domain resources associated with the first slot format and a second sequence of communication directions for time domain resources associated with the second slot format, wherein the first sequence of communication directions is different from the second sequence of communication directions, and wherein the apparatus communicates in accordance with a full-duplex communication mode based at least in part on the first sequence of communication directions and the second sequence of communication directions.

4. The apparatus of claim 2, wherein the first message or the third message, or both, further indicate a resource allocation for a guard band between the first resource block set and the second resource block set, and wherein the first message and the third message are a same message or are different messages.

5. The apparatus of claim 4, wherein the plurality of slot formats includes a third slot format for a third resource block set from the plurality of resource block sets, wherein the third slot format indicates that a portion of the third resource block set is unavailable for communications when the first slot format and the second slot format indicate full-duplex operation, and wherein the third resource block set is the guard band.

6. The apparatus of claim 5, wherein the third resource block set is located between the first resource block set and the second resource block set.

7. The apparatus of claim 4, wherein the instructions are further executable by the at least one processor to cause the apparatus to:
obtain an indication of a plurality of resource blocks between the first resource block set and the second resource block set, wherein the plurality of resource blocks is unavailable for communications when the first slot format and the second slot format indicate full-duplex operation, and wherein the plurality of resource blocks is the guard band.

8. The apparatus of claim 4, wherein the instructions are further executable by the at least one processor to cause the apparatus to:
add a plurality of resource blocks between the first resource block set and the second resource block set, wherein the plurality of resource blocks is unavailable for communications when the first slot format and the second slot format indicate full-duplex operation, and wherein the plurality of resource blocks is the guard band.

9. The apparatus of claim 4, wherein the instructions are further executable by the at least one processor to cause the apparatus to:
reserve, based on a defined rule, a plurality of resource blocks from the second resource block set when the first slot format and the second slot format indicate full-duplex operation, wherein the plurality of resource blocks interfaces with the first resource block set, and wherein the plurality of resource blocks is the guard band.

10. The apparatus of claim 1, wherein each slot format from the at least one slot format is associated with a respective resource block set from the at least one resource block set, and wherein one or more resource block sets not in the at least one resource block set are equivalent to one or more guard bands for the at least one resource block set.

11. The apparatus of claim 1, wherein
the update is responsive to obtaining the third message.

12. The apparatus of claim 11, wherein the slot format indicated for the resource block set by the third message is to overwrite the baseline slot format for the bandwidth in accordance with a defined rule.

13. The apparatus of claim 11, wherein the instructions are further executable by the at least one processor to cause the apparatus to:
obtain a fourth message that indicates whether the at least one slot format indicated for the at least one resource block set by the third message is to overwrite the baseline slot format for the bandwidth, wherein the update from the baseline slot format to the at least one slot format indicated for the at least one resource block set by the third message is in accordance with the fourth message indicating that the at least one slot format indicated for the at least one resource block set by the third message is to overwrite the baseline slot format for the bandwidth.

14. The apparatus of claim 1, wherein the first message indicates, for each respective resource block set from the plurality of resource block sets, a respective indication of a respective quantity of resource blocks in the respective resource block set, and wherein the resource block set includes a first quantity of resource blocks in accordance with a first indication for the resource block set and a second resource block set includes a second quantity of resource blocks in accordance with a second indication for the second resource block set.

15. The apparatus of claim 1, wherein each index from the plurality of indexes indicates a frequency domain location of a corresponding resource block set from the plurality of resource block sets, and wherein each index comprises a starting resource block index or an ending resource block index.

16. The apparatus of claim 1, wherein the communication is in accordance with a full-duplex communication operation, wherein the full-duplex communications operation is associated with the at least one slot format and one or more slot formats indicated for other resource block sets of the plurality of resource block sets.

17. The apparatus of claim 16, wherein each resource block set from the plurality of resource block sets is associated with a downlink subband or an uplink subband, and wherein the full-duplex communication mode includes subband full-duplex operation at the apparatus.

18. A wireless node, comprising:
one or more transceivers;
at least one processor; and
memory comprising instructions executable by the at least one processor to cause the wireless node to:
receive, via the one or more transceivers, a first message that indicates a plurality of resource block sets and that indicates a plurality of indexes corresponding to the plurality of resource block sets;
receive, via the one or more transceivers, a second message that indicates a baseline slot format associated with a bandwidth that includes the plurality of resource block sets;
receive, via the one or more transceivers, a third message that includes at least one index corresponding to at least one resource block set from the plurality of resource block sets and that indicates at least one slot format associated with the at least one resource block set, wherein a respective slot format of the at least one slot format corresponds to a respective resource block set of the at least one resource block set;
update the at least one resource block set from the baseline slot format to the at least one slot format indicated for the at least one resource block set by the third message;
communicate, in accordance with the baseline slot format, via a portion of the bandwidth that excludes the at least one resource block set; and
communicate using the at least one resource block set in accordance with the at least one slot format.

19. The wireless node of claim 18, wherein the one or more transceivers receive the first message and the third message from a centralized unit (CU) via an F1 interface, wherein the first message and the third message indicate a subband configuration per cell to the wireless node, and wherein the wireless node is a distributed unit (DU).

20. The wireless node of claim 18, wherein the one or more transceivers receive the first message and the third message from a network entity via radio resource control (RRC) signaling as a semi-static indication of a subband configuration, and wherein the wireless node is a user equipment (UE).

21. The wireless node of claim 18, wherein the one or more transceivers receive the first message and the third message from a network entity via one or more medium access control (MAC) control elements (MAC-CEs) or downlink control information (DCI) as a dynamic indication of a subband configuration, and wherein the wireless node is a user equipment (UE).

22. The wireless node of claim 18, wherein the one or more transceivers receive the first message and the third message from a network entity via one or more system information blocks (SIBs) as a broadcast of a subband configuration, and wherein the wireless node is a user equipment (UE).

23. An apparatus for wireless communication, comprising:
- at least one processor; and
- memory comprising instructions executable by the at least one processor to cause the apparatus to:
  - output a first message that indicates a plurality of resource block sets and that indicates a plurality of indexes corresponding to the plurality of resource block sets;
  - output a second message that indicates a baseline slot format associated with a bandwidth that includes the plurality of resource block sets;
  - output a third message that includes at least one index from the plurality of indexes corresponding to at least one resource block set from the plurality of resource block sets and that indicates at least one slot format associated with the at least one resource block set, wherein a respective slot format of the at least one slot format corresponds to a respective resource block set of the at least one resource block set;
  - communicate, in accordance with the baseline slot format, via a portion of the bandwidth that excludes the at least one resource block set; and
  - communicate using the at least one resource block set in accordance with the at least one slot format.

24. The apparatus of claim 23, wherein:
- the at least one slot format comprises a plurality of slot formats;
- the at least one resource block set comprises the plurality of resource block sets;
- each slot format from the plurality of slot formats is associated with a respective resource block set from the plurality of resource block sets; and
- the plurality of slot formats includes a first slot format for a first resource block set and a second slot format for a second resource block set, the first resource block set and the second resource block set being from the plurality of resource block sets.

25. The apparatus of claim 24, wherein the third message indicates a first sequence of communication directions for time domain resources associated with the first slot format and a second sequence of communication directions for time domain resources associated with the second slot format, wherein the first sequence of communication directions is different from the second sequence of communication directions, and wherein the apparatus communicates in accordance with a full-duplex communication mode based at least in part on the first sequence of communication directions and the second sequence of communication directions.

26. The apparatus of claim 24, wherein the first message or the third message, or both, further indicate a resource allocation for a guard band between the first resource block set and the second resource block set, and wherein the first message and the third message are a same message or are different messages.

27. The apparatus of claim 26, wherein the plurality of slot formats includes a third slot format for a third resource block set from the plurality of resource block sets, wherein the third slot format indicates that a portion of the third resource block set is unavailable for communications when the first slot format and the second slot format indicate full-duplex operation, and wherein the third resource block set is the guard band.

28. The apparatus of claim 27, wherein the third resource block set is located between the first resource block set and the second resource block set.

29. The apparatus of claim 26, wherein the instructions are further executable by the at least one processor to cause the apparatus to:
- output an indication of a plurality of resource blocks between the first resource block set and the second resource block set, wherein the plurality of resource blocks is unavailable for communications when the first slot format and the second slot format indicate full-duplex operation, and wherein the plurality of resource blocks is the guard band.

30. The apparatus of claim 23, further comprising one or more transceivers configured to transmit the first message and the third message and to communicate using the at least one resource block set, wherein the apparatus is configured as a network entity.

* * * * *